US009019839B2

(12) United States Patent
Ulybin

(10) Patent No.: US 9,019,839 B2
(45) Date of Patent: Apr. 28, 2015

(54) DEVICE, SYSTEM, AND METHOD OF MONITORING FAX RELAY

(75) Inventor: Vladimir Ulybin, Rishon Lezion (IL)

(73) Assignee: AudioCodes Ltd., Lod (IL)

( * ) Notice: Subject to any disclaimer, the term of this patent is extended or adjusted under 35 U.S.C. 154(b) by 159 days.

(21) Appl. No.: 13/589,141

(22) Filed: Aug. 19, 2012

(65) Prior Publication Data

US 2014/0050101 A1 Feb. 20, 2014

(51) Int. Cl.
*H04N 1/00* (2006.01)
*G06F 11/00* (2006.01)
*H04L 12/24* (2006.01)

(52) U.S. Cl.
CPC ........ *H04L 41/5067* (2013.01); *H04L 41/5038* (2013.01)

(58) Field of Classification Search
CPC ... H04L 65/80; H04L 65/607; H04L 45/3065; H04L 47/28; H04L 67/322; H04N 1/0022; H04N 1/00209; H04N 1/32625; H04N 1/33338; H04N 2201/0093; H04M 2203/2066; H04M 3/22; H04M 2201/52
USPC .......... 370/242; 358/407, 442, 400, 404, 406, 358/468; 379/100.05
See application file for complete search history.

(56) References Cited

U.S. PATENT DOCUMENTS

| | | | | |
|---|---|---|---|---|
| 5,526,123 | A * | 6/1996 | Yoshida et al. | 358/426.12 |
| 6,411,689 | B1 * | 6/2002 | Shi et al. | 379/100.17 |
| 6,463,135 | B2 * | 10/2002 | Abrishami et al. | 379/100.01 |
| 6,483,600 | B1 * | 11/2002 | Schuster et al. | 358/1.15 |
| 6,535,906 | B1 * | 3/2003 | Barber et al. | 709/200 |
| 7,899,038 | B2 | 3/2011 | Ulybin | |
| 2003/0123464 | A1 * | 7/2003 | Lee et al. | 370/401 |
| 2006/0146784 | A1 * | 7/2006 | Karpov et al. | 370/351 |
| 2006/0192995 | A1 * | 8/2006 | Li | 358/1.15 |
| 2008/0094661 | A1 * | 4/2008 | Lee et al. | 358/1.15 |
| 2009/0034015 | A1 * | 2/2009 | Mulligan et al. | 358/408 |
| 2010/0260193 | A1 * | 10/2010 | Ulybin | 370/401 |
| 2010/0296121 | A1 * | 11/2010 | Shaheen et al. | 358/1.15 |
| 2011/0109936 | A1 * | 5/2011 | Coffee et al. | 358/1.15 |
| 2012/0013937 | A1 * | 1/2012 | Ashmore et al. | 358/1.15 |
| 2012/0236845 | A1 * | 9/2012 | Li et al. | 370/352 |
| 2013/0271782 | A1 * | 10/2013 | Ashmore et al. | 358/1.14 |
| 2014/0064267 | A1 * | 3/2014 | Thi et al. | 370/352 |

OTHER PUBLICATIONS

"QualityLogic Launches DataProbe T30-T38 Analyzer for Monitoring and Analyzing Facsimile Traffic and Systems," Marketwire, Jun. 17, 2008.*
"Considerations for Using T.38 versus G.711 for Fax over IP," Dialogic, Jun. 2011.*

(Continued)

*Primary Examiner* — Alpus H Hsu
*Assistant Examiner* — Elton Williams
(74) *Attorney, Agent, or Firm* — Eitman, Mehulal & Sadot

(57) ABSTRACT

Device, system, and method of monitoring fax relay. An apparatus for measuring Quality of Service (QoS) of Fax over Internet Protocol (FoIP) calls includes: a FoIP packet monitoring module to monitor in real-time Internet Protocol (IP) network streams exchanged between a FoIP emitter device and a FoIP receiver device; a FoIP equipment evaluator to evaluate real-time performance of at least one of: the FoIP emitter device, and the FoIP receiver device; and a FoIP call QoS evaluator to evaluate in real time a FoIP call QoS quality of a FoIP communication between said FoIP emitter device and said FoIP receiver device.

17 Claims, 9 Drawing Sheets

(56) References Cited

OTHER PUBLICATIONS

"MultiVoip, Voice/Fax Over IP Networks Models MVP400 and MVP800;" MultiTechSystems, Jun. 5, 2000.*

"Standardization of Group 3 facsimile terminals for document transmission;" ITU-T Recommendation T.4; Jul. 2003.*

"Procedures for the identification and selection of common modes of operation between data circuit-terminating equipments (DCEs) and between data terminal equipments (DTEs) over the public switched telephone network and leased point-to-point telephone-type circuits;" ITU-T Reecommendation V.8bis; Nov. 2000.*

International Telecommunication Union (ITU), Telecommunication Standardization Sector (ITU-T), ITU-T Recommendation E.450, Facsimile quality of service on public networks—General aspects, published Mar. 1998.

International Telecommunication Union (ITU), Telecommunication Standardization Sector (ITU-T), ITU-T Recommendation E.451, Facsimile call cut-off performance, published Feb. 2001.

International Telecommunication Union (ITU), Telecommunication Standardization Sector (ITU-T), ITU-T Recommendation E.452, Facsimile Modem Speed Reductions and Transaction Time, published Mar. 1993.

International Telecommunication Union (ITU), Telecommunication Standardization Sector (ITU-T), ITU-T Recommendation E.453, Facsimile Image Quality as Corrupted by Transmission-Induced Scan Line Errors, published Aug. 1994.

International Telecommunication Union (ITU), Telecommunication Standardization Sector (ITU-T), ITU-T Recommendation E.454, Transmission Performance Metrics based on Error Correction Mode (ECM) Facsimile, published Oct. 1996.

International Telecommunication Union (ITU), Telecommunication Standardization Sector (ITU-T), ITU-T Recommendation E.456, Test Transaction for Facsimile Transmission Performance, published Mar. 1998.

International Telecommunication Union (ITU), Telecommunication Standardization Sector (ITU-T), ITU-T Recommendation E.457, Facsimile Measurement Methodologies, published Feb. 1996.

International Telecommunication Union (ITU), Telecommunication Standardization Sector (ITU-T), ITU-T Recommendation E.458, Figure of Merit for Facsimile Transmission Performance, published Feb. 1996.

International Telecommunication Union (ITU), Telecommunication Standardization Sector (ITU-T), ITU-T Recommendation E.459, Measurements and metrics for characterizing facsimile transmission performance using non-intrusive techniques, published Mar. 1998.

International Telecommunication Union (ITU), Telecommunication Standardization Sector (ITU-T), ITU-T Recommendation E.460, Measurements and metrics for monitoring the performance of V.34 Group 3 facsimile, published Mar. 2000.

International Telecommunication Union (ITU), Telecommunication Standardization Sector (ITU-T), ITU-T Recommendation T.4, Standardization of Group 3 facsimile terminals for document transmission, published Apr. 1999.

International Telecommunication Union (ITU), Telecommunication Standardization Sector (ITU-T), ITU-T Recommendation T.30, Procedures for document facsimile transmission in the general switched telephone network, published Sep. 2005.

International Telecommunication Union (ITU), Telecommunication Standardization Sector (ITU-T), ITU-T Recommendation T.38, Procedures for real-time Group 3 facsimile communication over IP networks, published Sep. 2010.

* cited by examiner

DEVICE, SYSTEM, AND METHOD OF MONITORING FAX RELAY

FIELD

The present invention relates to the field of facsimile communication.

BACKGROUND

Facsimile communication, commonly referred to as fax communication, may include telephonic transmission of a scanned document to a remote terminal over a telephone line. For example, a printed document may be scanned at a first fax terminal, which generates a bitmap graphic image that corresponds to the content of the scanned document. The data of the bitmap graphic image may then be transmitted by using a fax modem over a telephone line to a second, remote, fax terminal, which may convert the received data into an image and may print that image on paper.

A fax relay system may be used for transferring facsimile calls in real time over a packet-based network. For example, a fax relay system may utilize Fax over Internet Protocol (FoIP) communications, which may be in accordance with Recommendation T.38 of the Standardization Sector of the International Telecommunication Union (ITU).

SUMMARY

The present invention may include, for example, devices, systems, and methods for monitoring the Quality of Service (QoS) of fax relay, particularly in Fax over Internet Protocol (FoIP) systems, as well as performing diagnostics for such systems and detecting problems therein.

In accordance with the present invention, an apparatus for measuring Quality of Service (QoS) of Fax over Internet Protocol (FoIP) calls may include: a FoIP packet monitoring module to monitor in real-time Internet Protocol (IP) network streams exchanged between a FoIP emitter device and a FoIP receiver device; a FoIP equipment evaluator to evaluate real-time performance of at least one of: the FoIP emitter device, and the FoIP receiver device; and a FoIP call QoS evaluator to evaluate in real time a FoIP call QoS quality of a FoIP communication between said FoIP emitter device and said FoIP receiver device.

In accordance with the present invention, the FoIP packet monitoring module may include: a FoIP stream error detectors sub-unit to detect in real time FoIP stream errors; and a T.30 diagnostics measurement sub-unit to measure in real time T.30 diagnostics measurements.

In accordance with the present invention, the FoIP stream error detectors sub-unit may include: a FoIP stream collision detector to detect collisions of FoIP streams exchanged between said FoIP emitter device and said FoIP receiver device; wherein at least one of said FoIP equipment evaluator and said FoIP call QoS evaluator, takes into account output generated by the FoIP stream collision detector.

In accordance with the present invention, the FoIP stream error detectors sub-unit may include: a FoIP T.30 control stream under-run error detector to detect a possible under-run error of a T.30 control signal transmitter of said FoIP emitter device or of said FoIP receiver device; wherein at least one of said FoIP equipment evaluator and said FoIP call QoS evaluator, takes into account output generated by the FoIP T.30 control stream under-run error detector.

In accordance with the present invention, the FoIP stream error detectors sub-unit may include: a fax image stream transfer error detector to detect possible over-run and under-run errors of fax image transmitter of FoIP receiver.

In accordance with the present invention, at least one of said FoIP equipment evaluator and said FoIP call QoS evaluator, takes into account output generated by the fax image stream transfer error detector.

In accordance with the present invention, the FoIP stream error detectors sub-unit may include: a FoIP call establishment problem detector to detect problems in FoIP call establishment; and a FoIP stream violation detector to detect a FoIP stream violation; wherein at least one of said FoIP equipment evaluator and said FoIP call QoS evaluator, takes into account output generated by at least one of the FoIP call establishment problem detector and the FoIP stream violation detector.

In accordance with the present invention, the FoIP stream error detectors sub-unit may include a FoIP T.30 control stream error detector to detect errors of FoIP T.30 control streams; and the T.30 diagnostics measurement sub-unit may include a T.30 call establishment problem detector to detect a problem in T.30 call establishment between said FoIP emitter device and said FoIP receiver device; wherein at least one of said FoIP equipment evaluator and said FoIP call QoS evaluator, takes into account output generated by at least one of the FoIP T.30 control stream error detector and the T.30 call establishment problem detector.

In accordance with the present invention, the FoIP stream error detectors sub-unit may include: a FoIP packet loss detector to detect FoIP packet loss; and an Inter-Packet Delay (IPD) detector to detect a long IPD in a FoIP stream sent between said FoIP emitter device and said FoIP receiver device; wherein at least one of said FoIP equipment evaluator and said FoIP call QoS evaluator, takes into account output generated by at least one of the FoIP packet loss detector and the IPD detector.

In accordance with the present invention, the T.30 diagnostics measurement sub-unit may include: a fax image data error detector to check fax image data errors; wherein at least one of said FoIP equipment evaluator and said FoIP call QoS evaluator, takes into account output generated by the fax image data error detector.

In accordance with the present invention, the T.30 diagnostics measurement sub-unit may include: a fax image data rate estimator to estimate an actual data rate of fax image data sent by said FoIP emitter device; wherein at least one of said FoIP equipment evaluator and said FoIP call QoS evaluator, takes into account output generated by the fax image data rate estimator.

In accordance with the present invention, the T.30 diagnostics measurement sub-unit may include: an incompatible FoIP call detector to detect a FoIP call which may be unsupported by at least one of: said FoIP emitter device and said FoIP receiver device; and a T.30 signal flow violation detector to detect FoIP packets irrelevant to a current T.30 phase; wherein at least one of said FoIP equipment evaluator and said FoIP call QoS evaluator, takes into account output generated by at least one of the incompatible FoIP call detector and the T.30 signal flow violation detector.

In accordance with the present invention, the FoIP stream error detectors sub-unit may include: a T.30 Training Check Frame (TCF) stream under-run error detector to detect a possible under-run error of a T.30 TCF transmitter of FoIP receiver; and the T.30 diagnostics measurement sub-unit comprises a T.30 TCF error detector to detect a T.30 TCF error in a T.30 stream sent from said FoIP emitter device to said FoIP receiver device; wherein at least one of said FoIP equipment evaluator and said FoIP call QoS evaluator, takes into account output generated by at least one of the T.30 TCF stream under-run error detector and the T.30 TCF error detector.

In accordance with the present invention, the T.30 diagnostics measurement sub-unit may include: a timeout detector to detect at least one of: a no-stream FoIP timeout, and a T.30 phase timeout; wherein at least one of said FoIP equipment evaluator and said FoIP call QoS evaluator, takes into account output generated by the timeout detector.

In accordance with the present invention, the T.30 diagnostics measurement sub-unit may include: a fax call parameters detector to detect one or more parameters of a fax call between said FoIP emitter device and said FoIP receiver device; wherein at least one of said FoIP equipment evaluator and said FoIP call QoS evaluator, takes into account output generated by the fax call parameters detector.

In accordance with the present invention, the FoIP equipment evaluator may include: an evaluation unit to evaluate in real time a performance of the IP network during a FoIP call, and to evaluate in real time a performance of at least one of: the FoIP emitter device, and the FoIP receiver device; wherein the evaluation unit takes into account an output generated by at least one of: said FoIP stream error detectors sub-unit, and said T.30 diagnostics measurement sub-unit.

In accordance with the present invention, the apparatus may include a FoIP call Quality of Service (QoS) evaluator to evaluate a QoS of a FoIP call; wherein the FoIP call QoS evaluator may include: a Figure of Merit (FOM) estimator, to estimate a FOM value associated with said FoIP call; and an overall FoIP call result evaluator, to estimate a quality of FoIP call taking into account an output generated by at least one of: the FOM estimator, and said FoIP equipment evaluator.

In accordance with the present invention, the apparatus may be or may include a FoIP gateway.

In accordance with the present invention, the apparatus may be or may include a Session Border Controller (SBC).

In accordance with the present invention, the apparatus may be or may include a computerized platform external to said FoIP emitter device, external to said FoIP receiver device, external to a FoIP gateway, and external to a Session Border Controller (SBC).

In accordance with the present invention, a device may be operably associated with the apparatus, and the device may include: a data receiver to receive, from said apparatus, real-time reports of monitored FoIP streams; and an evaluator to cumulatively evaluate, based on an aggregation of said real-time reports, an overall quality of a FoIP service.

In accordance with the present invention, the evaluator may evaluate performance of at least one of: a FoIP emitter device, a FoIP receiver device, and an IP network path through which FoIP packets are sent between the FoIP emitter device and the FoIP receiver device.

In accordance with the present invention, a method for measuring Quality of Service (QoS) of Fax over Internet Protocol (FoIP) calls may include: monitoring in real-time Internet Protocol (IP) network streams exchanged between a FoIP emitter device and a FoIP receiver device; evaluating real-time performance of at least one of: the FoIP emitter device, and the FoIP receiver device; and evaluating in real time a FoIP call QoS quality of a FoIP communication between said FoIP emitter device and said FoIP receiver device; wherein monitoring in real-time IP network streams exchanged between a FoIP emitter device and a FoIP receiver device comprises: detecting in real time FoIP stream errors, and measuring in real time T.30 diagnostics measurements. The method may be implementable by utilizing at least a hardware component.

In accordance with the present invention, the method may be implementable by utilizing a hardware device selected from the group consisting of: a FoIP gateway; a Session Border Controller (SBC); a computerized platform external to said FoIP emitter device, external to said FoIP receiver device, external to a FoIP gateway, and external to a Session Border Controller (SBC).

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF SOME EMBODIMENTS

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Figure 1:
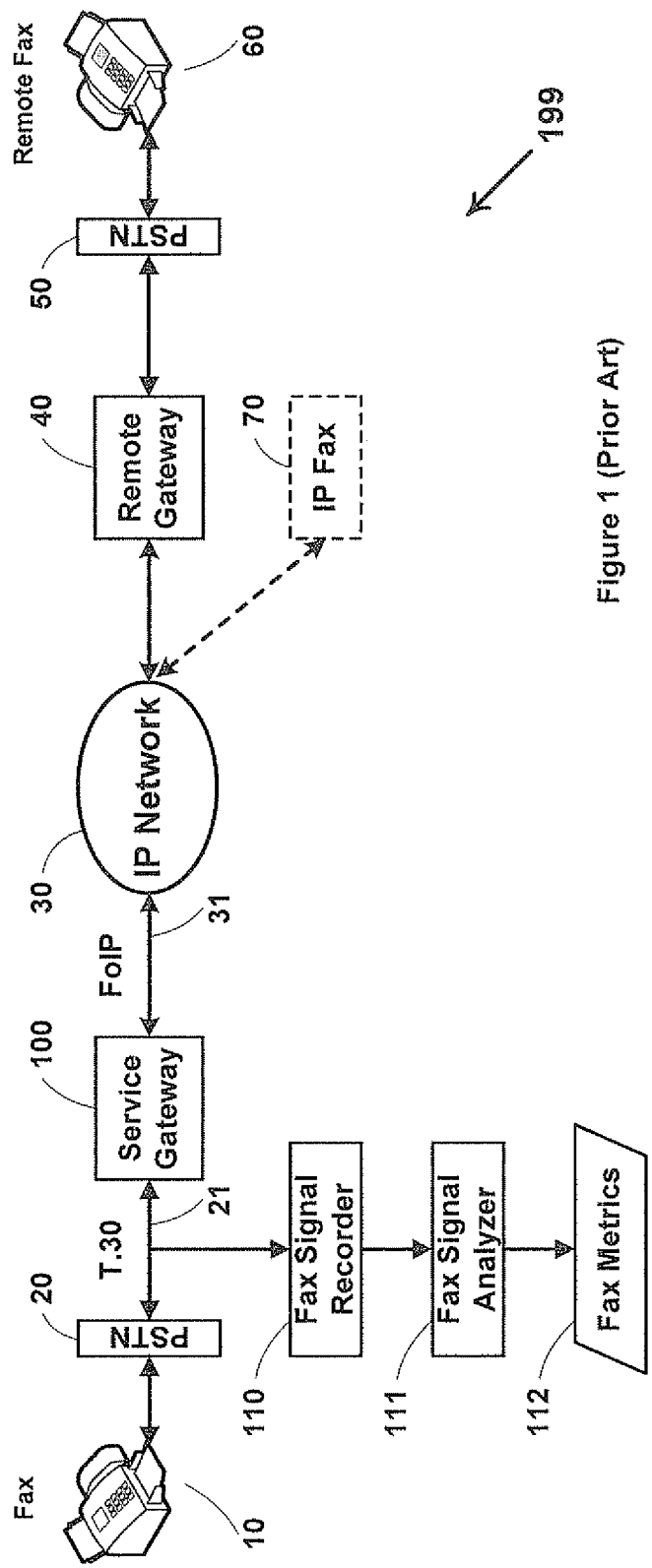
FIG. 1 is a schematic block-diagram illustration of a prior art FoIP system able to monitor analog fax signals.
Figure 2:
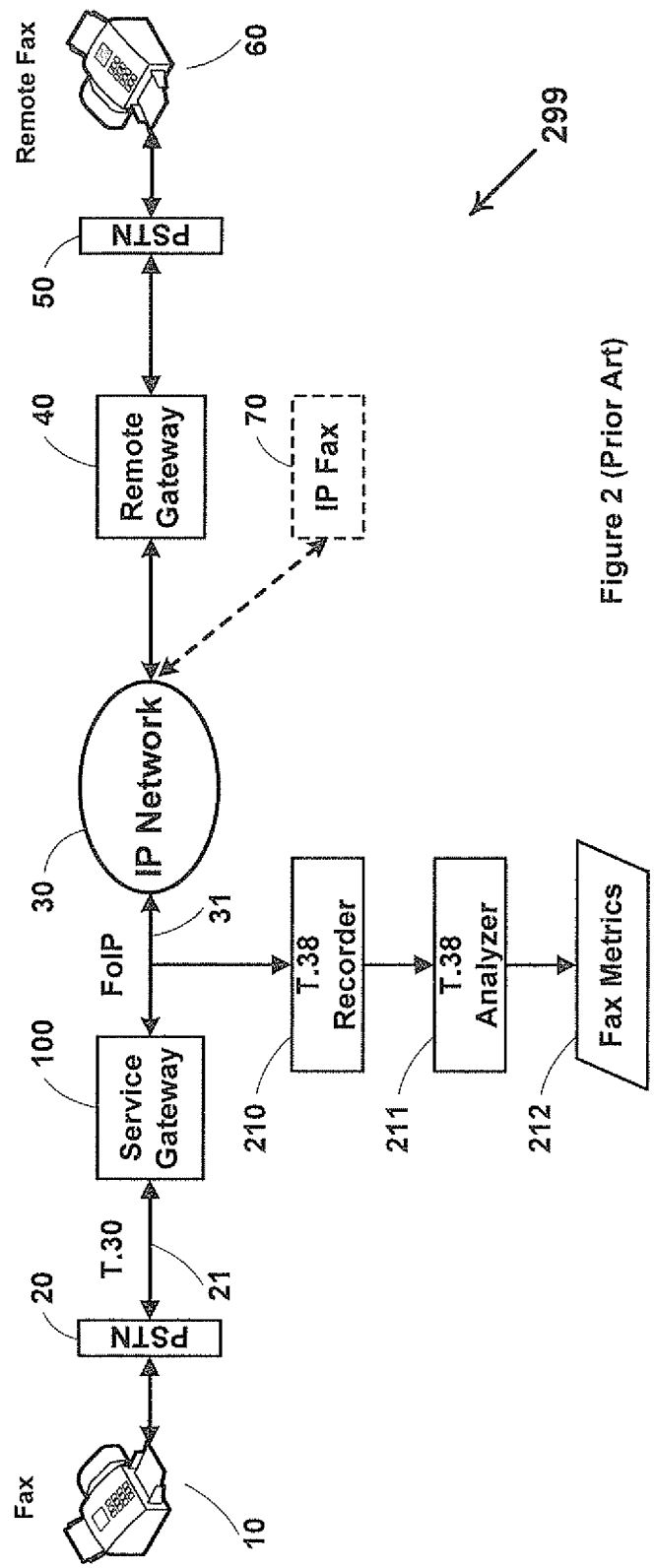
FIG. 2 is a schematic block-diagram illustration of another prior art FoIP system able to monitor analog fax signals.
Figure 3:
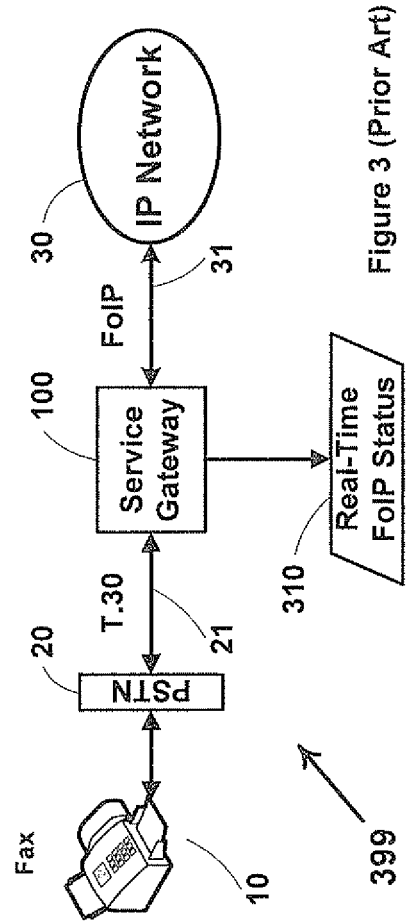
FIG. 3 is a schematic block-diagram illustration of a local side of a prior art FoIP system able to monitor analog fax signals.

Applicant has realized that conventional systems and methods, which attempt to monitor performance of fax relays, are either unsuitable for FoIP systems or suffer from multiple deficiencies, as detailed herein with reference to FIGS. 1-3.

Reference is made to FIG. 1, which is a schematic block-diagram illustration of a prior art FoIP system 199 able to monitor analog fax signals. Particularly, system 199 may utilize fax call measurements for verification of transferring fax calls over a network, by monitoring analog fax signals exchanged between communicating fax terminals and FoIP gateways.

System 199 may include, for example, a local fax terminal 10, a local Public Switched Telephone Network (PSTN) 20, a local service gateway 100, an Internet Protocol (IP) network 30, a remote gateway 40, a remote PSTN 50, and a remote fax terminal 60. Local fax terminal 10 may be connected to local PSTN 20, which may be connected to local service gateway 100. Similarly, remote fax terminal 60 may be connected to remote PSTN 50, which may be connected to remote gateway 40. Local service gateway 100 may communicate over IP network 30 with remote gateway 40. Optionally, instead of utilizing remote gateway 40 and remote fax terminal 60, an IP-aware or IP capable fax terminal (referred to as "IP fax") 70 may be used.

During a fax relay call in system 199, local service gateway 100 may exchange analog fax signals 21 with local fax terminal 10. Local service gateway 100 may further exchange FoIP packets 31 with remote gateway 40 or with IP fax 70.

In accordance with a prior art method of operation, analog fax signals 21 may be transmitted by local fax terminal 10 and then by local service gateway 100. Analog fax signals 21 may optionally be recorded by a fax signal recorder 110 in their original sampling wave form, or analog fax signals 21 may be demodulated in real-time (e.g., utilizing a dedicated hardware component) and then recorded by fax signal recorder 110 in a pre-defined (e.g., proprietary) signal data log form. The recorded signals may be analyzed by a fax signal analyzer 111, which may be implemented by using as a software component in a computer workstation. Fax signal analyzer 111 may produce one or more fax metrics 112 which may be partially indicative of the quality of the fax call, for example, the quality of the fax image or the call result (e.g., success or failure). Fax metrics 112 may be stored, logged and/or monitored, at a calling fax side and/or at an answering fax side. Optionally, fax metrics 112 may be used to monitor or verify the fax relay operation of a gateway (e.g., service gateway 100).

Applicant has realized that the monitoring method utilized by system 199 may not be suitable for most FoIP service providers, for example, because a FoIP service may not have physical access to analog fax signals 21.

Reference is made to FIG. 2, which is a schematic block-diagram illustration of a prior art FoIP system 299 able to monitor analog fax signals. The components of system 299 may be generally similar to the components of system 199 of FIG. 1. System 299 may utilize fax call monitoring, for example, by capturing a network packet exchange between FoIP gateways, and then analyzing offline the captured streams of packets. For this purpose, system 299 may include a T.38 recorder 210 able to capture network data in real time. The recorded network streams may be examined off-line by a T.38 analyzer 211 (e.g., a software module), which may extract the relayed fax image data and may log fax metrics 212 (e.g., the decoded fax image and the call result). Optionally, a user may analyze the captured and recorded network packets by utilizing a suitable software program (e.g., Wireshark).

Applicant has realized that although the method utilized by system 299 may partially assist some FoIP gateway vendors and some IP-fax vendors, such method may be highly problematic for FoIP service providers. For example, the recording of T.38 streams and their offline analysis may not be suitable for a system that operates in real-time.

Applicant has further realized that for simultaneous transfer of multiple channels of FoIP calls, system 199 of FIG. 1 and/or system 299 of FIG. 2 may require extremely large storage capacity and computational resources in order to capture FoIP calls, decode the fax image streams, and analyze the signal flows.

Reference is made to FIG. 3, which is a schematic block-diagram illustration of a local side of a prior art FoIP system 399 able to monitor analog fax signals. The components of system 399 may be generally similar to the components of system 199 of FIG. 1. System 399 may utilize fax call monitoring, for example, by real-time fax measurements at a FoIP gateway.

System 399 may utilize real-time reporting of fax relay status data 310 by local service gateway 100 (e.g., a FoIP gateway) to a network server. When transferring fax calls, local service gateway 100 may report, for example, the current T.30 status, the modulation and demodulation parameters, a number of fax pages successfully relayed over the IP network, and/or other data.

System 399 may analyze the T.30 signal and the FoIP stream internally by local service gateway 100. Applicant has realized that system 399 may suffer from multiple deficiencies. For example: FoIP status reporting by local service gateway may be incomplete for Quality of Service (QoS) purposes and/or for diagnostics purposes. Additionally, access to gateway FoIP status reporting may be denied to the FoIP service provider, or may be only partially authorized (e.g., allowed only in gateway debug mode). Furthermore, fax call analysis and reporting by a FoIP gateway may utilize proprietary formats or proprietary data structures which may depend on the particular FoIP gateway vendor, and may further vary depending on the FoIP gateway version of the same provider, and thus a FoIP service provider using different FoIP gateways may have difficulties to measure fax QoS.

Figure 4A:
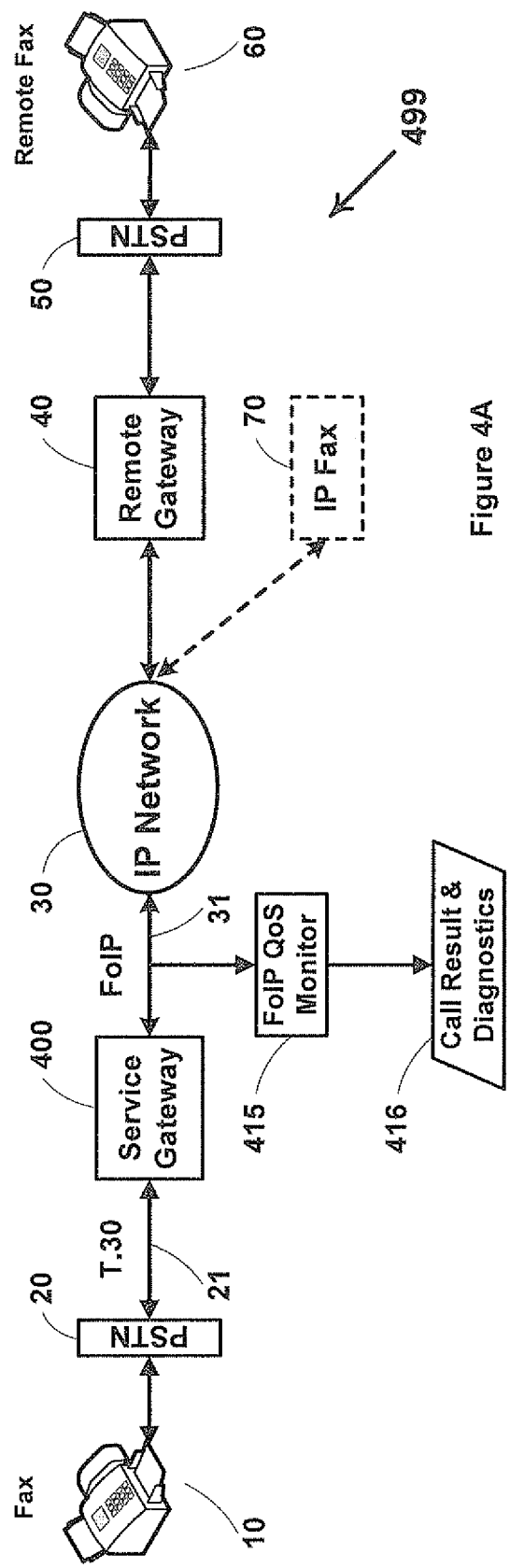
FIG. 4A is a schematic block-diagram illustration of a FoIP system capable of monitoring the Quality of Service (QoS) of a FoIP service, in accordance with the present invention.

Reference is made to FIG. 4A, which is a schematic block-diagram illustration of a FoIP system 499 capable of monitoring the Quality of Service (QoS) of a FoIP service, in accordance with the present invention. System 499 may analyze FoIP streams of two communicating gateways, for example, a local service gateway 400 and a remote gateway 40. Service gateway 400 may be a FoIP gateway in accordance with the present invention.

In contrast with prior art system 299 of FIG. 2, system 499 of the present invention may not require FoIP packet recording. Rather, in system 499, all the necessary fax QoS measurements may be performed in real time by a FoIP QoS monitor 415. For example, FoIP QoS monitor 415 may analyze the FoIP streams exchanged between service gateway 400 and remote gateway 40 (or IP fax 70) over IP network 30. FoIP QoS monitor 415 may further perform fax QoS measurements, may diagnose or evaluate the FoIP operation of service gateway 400, may diagnose or evaluate the FoIP operation of remote gateway 40, may diagnose or evaluate the FoIP operation of IP fax 70, and/or may diagnose or evaluate the FoIP operation of IP network 30. Upon completion of a monitored FoIP call, FoIP QoS monitor 415 may report the determined FoIP operation metrics, for example, the fax call result and diagnostics 416 of FoIP operation to an upper-level application or for another component or server, for cumulative measurements and/or diagnostics.

Optionally, FoIP QoS monitor may receive and handle the fax relay status reported by service gateway 400. In such case, FoIP QoS monitor 415 may achieve improved evaluation results for example, with regard to the performance of the analog interface of service gateway 400, or with regard to the performance of a switched network (e.g., PSTN 20) connected between service gateway 400 and fax terminal 10.

FoIP QoS monitor 415 may perform non-intrusive fax call data measurements which may be partially or fully compliant with ITU-T Recommendation E.459 and/or with ITU-T Recommendation E.460.

Figure 4B:
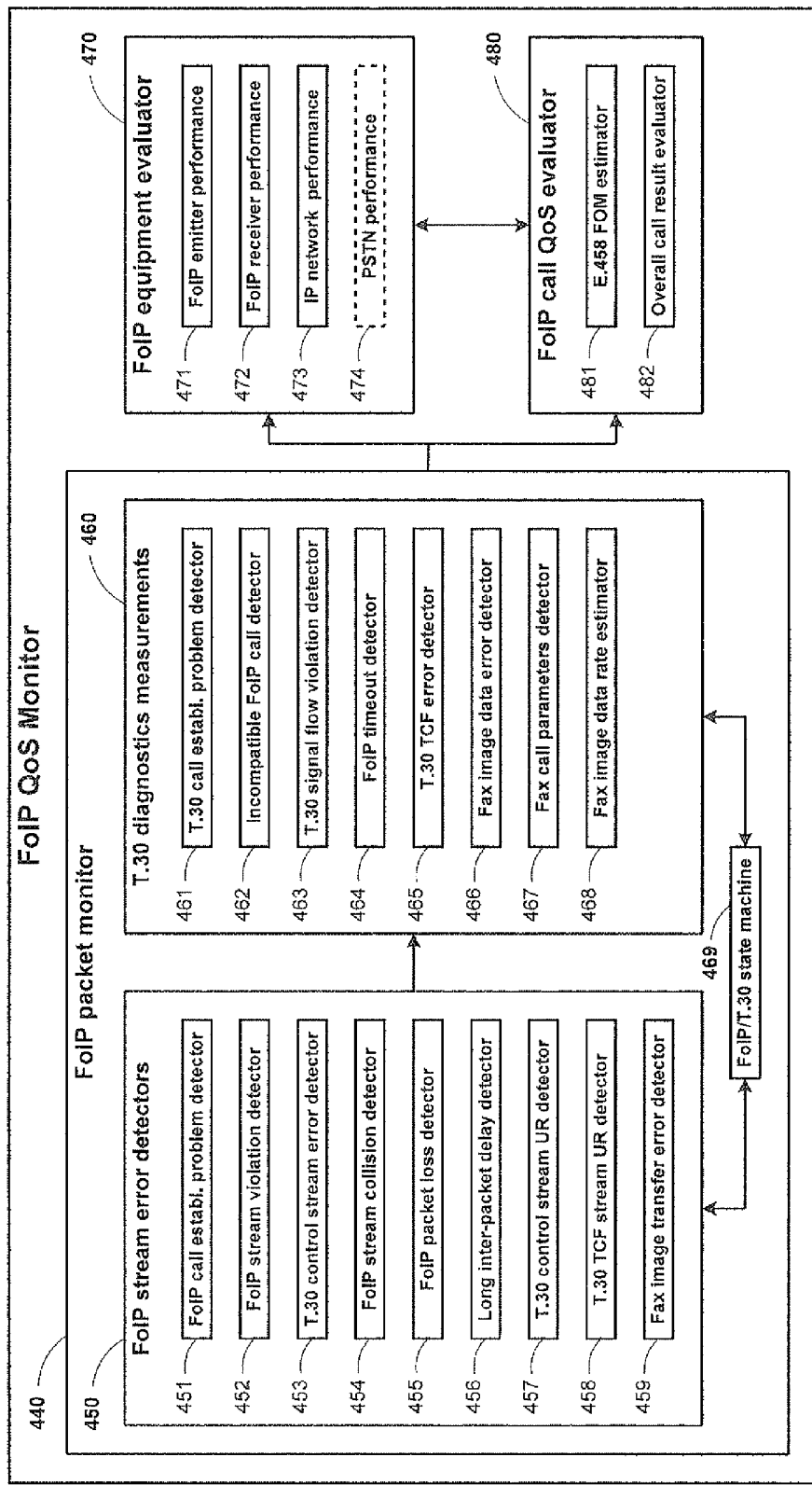
FIG. 4B is a schematic block-diagram illustration of FoIP QoS monitor, in accordance with the present invention.

Reference is made to FIG. 4B, which is a schematic block-diagram illustration of FoIP QoS monitor 415 showing components and modules thereof, in accordance with the present invention. Main modules of FoIP QoS monitor 415 may include, for example, a FoIP packet monitor module 440, a FoIP equipment performance evaluator 470, and a FoIP call QoS evaluator 480. FoIP packet monitor module 440 may include, for example, a FoIP stream error detectors unit 450, a T.30 diagnostics measurements unit 460, and/or a FoIP/T.30 state machine 469. FoIP stream error detectors unit 450 may include components or modules to perform fax relay packet measurements in order to detect possible problems related to fax relay packet transfer; such components or modules may include, for example: a FoIP call establishment problem detector 451; a FoIP stream violation detector 452; a FoIP T.30 control stream error detector 453; a FoIP stream collision detector 454; a FoIP packet loss detector 455; a long Inter-Packet Delay (IPD) detector 456; a FoIP T.30 control stream under-run error detector 457; a T.30 Training Check Frame (TCF) stream under-run error detector 458; and/or a fax image stream transfer error detector 459. Additionally, FoIP stream error detectors unit 450 may include other detectors of FoIP stream errors. T.30 diagnostics measurements unit 460 may include components or modules to perform T.30 diagnostics measurements in order to detect possible FoIP/T.30 problems and to measure fax call parameters; such components or modules may include, for example, a T.30 call establishment problem detector 461, an incompatible FoIP call detector 462, a T.30 signal flow violation detector 463, a FoIP timeout detector 464, a T.30 TCF error detector 465, a fax image data error detector 466, a fax call parameters detector 467, a fax image data rate estimator 468. Additionally, T.30 diagnostics measurements unit 460 may perform other diagnostics measurements. FoIP equipment performance evaluator 470 may include components or modules to evaluate a performance of equipment providing FoIP call; such components or modules may include, for example, a FoIP emitter performance evaluator 471, a FoIP receiver performance evaluator 472, a IP network performance evaluator 473, and/or, optionally, a PSTN performance evaluator 474. FoIP call QoS evaluator 480 may include components or modules to evaluate an overall FoIP call quality such components or modules may include, for example, a Figure of Merit (FOM) estimator 481, and/or an overall FoIP call result evaluator 482. FoIP QoS monitor 415 may include some or all of components 451-482, which may be implemented using software modules and/or hardware components.

FoIP call establishment problem detector 451 may detect problems in FoIP call establishment. For example, FoIP QoS monitor 415 may be pre-programmed or may be configured (e.g., by an upper-level application) in accordance with FoIP capabilities of one or more particular communicating FoIP gateways. Such upper-level application may be, for example, a component or module responsible for allocation and management of FoIP QoS monitor 415. FoIP call establishment problem detector 451 may detect, for example, conflicts between FoIP capabilities of a first gateway initiating a FoIP session and FoIP capabilities of a second gateway confirming the transition to FoIP operation. Additionally or alternatively, FoIP call establishment problem detector 451 may detect an error of a one-way FoIP stream, caused by absent or malformed FoIP stream from one of the communicating gateways.

FoIP stream violation detector 452 may verify the packets transferred over IP network 30 between communicating gateways. FoIP stream violation detector 452 may detect, for example, one or more of the following FoIP stream violations: (1) primary fax packet overflow relative to maximum primary frame size capability of a destination gateway; (2) datagram overflow relative to maximum datagram size capability of a destination gateway; (3) malformed packets; and/or (4) incorrect FoIP encoding. Violation (1) and/or violation (2) may be detected, for example, by checking the FoIP packets according to gateway capabilities. Violation (3) may be detected, for example, by verifying a packetization of primary packet frame and error correction data contributing to a total packet length. Violation (4) may be detected by checking the FoIP indicator packets and data packets according to FoIP encoding rules.

FoIP T.30 control stream error detector 453 may detect errors in FoIP streams transferring T.30 control packets. T.30 control packets may relay T.30 indicators or low rate T.30 data, for example, V.21 data, or V.34 control channel data, or V.8 messages, or V.34-rate information. Applicant has realized that, for example, the following T.30-related errors may affect the FoIP QoS: (a) High-level Data Link Control (HDLC) frame errors, for example, incorrect frame length, absence of HDLC address, and/or absence of HDLC control fields; (b) transferring facsimile control fields that may be unsupported by a FoIP gateway; (c) T.30 final frame re-ordering; and/or (d) missing T.30 indicator packets. FoIP T.30 control stream error detector 453 may detect T.30 stream errors (a) and (b), for example, by checking the HDLC frame headers; may detect error (c) by verifying the HDLC frame sequence; and may detect error (d) by checking transmission of T.30 indicator packets according to selected FoIP protocol.

FoIP stream collision detector 454 may detect FoIP stream collisions. Applicant has realized that facsimile communication over packet network(s) may be significantly affected by excessive delays of packet streams in the packet network(s). Various reasons may cause the delay of FoIP streams, for example, (A) FoIP call establishment delay, (B) FoIP gateway processing delay, (C) passing FoIP packets over multiple network nodes, and/or (D) FoIP operation in tandem with other gateways working in FoIP or in voice-band-data modes. The T.30 command re-transmissions caused by IP network delay (or by normal fax procedures), and further affected by the IP network delay, may result in FoIP stream collisions. The FoIP stream collisions may affect the FoIP gateway operation (e.g., of service gateway 400 or remote gateway 40), or may cause analog signal collision in a link between a FoIP gateway (e.g., service gateway 400 or remote gateway 40) and a fax terminal (e.g., fax 10 or remote fax 60). FoIP stream collision detector 454 may detect these types of FoIP stream collisions, for example, by checking the correspondence of FoIP streams received from the IP network to the current T.30 phase of the FoIP emitter or the FoIP receiver. The current T.30 phase may be derived by FoIP/T.30 state machine 469 from previously-received streams, in both directions.

FoIP packet loss detector 455 may check the sequence number of a currently-received FoIP packet, relative to the sequence number of previously-received FoIP packet(s), and may take into account the FoIP error correction data transferred in according with FoIP capabilities of the communicating gateways. FoIP packet loss detector 455 may measure (e.g., independently from each other) the packet loss of T.30 control streams sent by FoIP emitting gateway, the packet loss of T.30 control streams sent by FoIP receiving gateways, and/or the packet loss of fax image streams sent by FoIP emitting gateway. These measurements of packet loss for different streams may be utilized as diagnostics of different network paths, and may be used to identify source reasons of possible fax failure or quality degradation.

Long IPD detector 456 may detect long inter-packet delays. When forwarding the fax relay packets to FoIP QoS monitor 415 for QoS and diagnostics measurements, an upper-level application may attach the timestamps, source identifier, and/or other attributes or meta-data or descriptors of the fax relay packets. The FoIP IPD may be measured by using timestamps. The delays between consequent data packets of the same FoIP stream may contribute to IPD measurements; whereas the delays of HDLC frame data relative to previous HDLC frames may be excluded. The FoIP IPD measurements may include, for example, IPD averaging, determining the maximal IPD, computing the FoIP packet jitter (IPD variation), or other IPD-related calculations. Long IPD detector 456 may measure (e.g., independently of each other) the IPD of T.30 control streams sent by FoIP emitting gateway, the IPD of T.30 control streams sent by FoIP receiving gateways, and the IPD of fax image streams sent by FoIP emitting gateway. These measurements of FoIP inter-packet delays for different streams may be utilized as diagnostics of different network paths, and may be used to identify source reasons of possible fax failure or quality degradation.

FoIP T.30 control stream under-run error detector 457 may detect possible under-run errors of T.30 control streams. In order to avoid an excessively-long processing delay of T.30 commands and responses, a FoIP gateway (e.g., service gateway 400 or remote gateway 40) may start the T.30 control data transmission toward a linked fax terminal (e.g. fax 10 or remote fax 60) before the FoIP gateway receives a complete HDLC frame from IP network 30, based on an assumption that the HDLC octets that are currently lacking for transmission may arrive in a pre-configured or measured IPD time. However, if the lacking octets of HDLC frame are abnormally delayed in the network, the real-time T.30 control transmitter of FoIP gateway (e.g., service gateway 400 or remote gateway 40) may suffer from under-run errors. Accordingly, control stream under-run error detector 457 may detect (e.g., independently of each other) the under-run errors related to T.30 control data sent by FoIP emitting and/or FoIP receiving gateways.

T.30 TCF stream under-run error detector 458 may detect T.30 TCF stream under-run errors. For example, an under-run error of T.30 TCF stream may happen if a FoIP gateway starts the TCF data transmission toward the fax terminal before that FoIP gateway receives the complete TCF data from the IP network, while assuming that the TCF octets that are currently lacking for transmission may arrive in a pre-configured or measured IPD time. If the lacking TCF octets are abnormally delayed in the network, the real-time TCF transmitter of the FoIP gateway may suffer from under-run error. T.30 TCF stream under-run error detector 458 may detect possible under-run errors of T.30 TCF streams, for example, by checking delays between currently-received TCF data packets and already-transferred TCF data.

Fax image stream transfer error detector 459 may detect over-run and under-run errors of fax image streams. For example, fax image stream error detector 459 may utilize a FoIP receiver capability of maximum buffer size (e.g., FaxMaxBuffer) which may indicate the maximum number of octets that may be stored on the FoIP receiver before an overflow condition occurs. To detect a possible overflow, fax image stream transfer error detector 459 may compare the difference between the amount of fax image data received from the IP network (FaxLengRx) and the amount of fax image data that may be transmitted to a fax terminal by FoIP receiver (FaxLengTx) for a measured time interval relative to the maximum buffer size of FoIP receiver (FaxMaxBuffer). For example, an over-run error may be detected if (FaxLengRx−FaxLengTx) is greater than FaxMaxBuffer.

Under-run errors of fax image streams may further be detected, even though such under-run errors of fax image streams may be less critical for FoIP transfer, because such errors may be corrected by a FoIP receiver gateway (for example, by HDLC flag transmission between HDLC frames of ECM fax image, or by T.4 filling between scan lines of T.4 non-ECM fax image). However, particularly for some FoIP gateways which may be incapable of filling the T.4 non-ECM fax image, fax image stream transfer error detector 459 may detect possible under-run errors of fax image streams. Fax image stream transfer error detector 459 may compare the difference between the amount of fax image data received from the IP network (FaxLengRx) for a measured time interval, and the amount of fax image data that may be transmitted to a fax terminal by FoIP receiver gateway (FaxLengTx) for the same time interval. An under-run error may be detected, for example, if (FaxLengTx−FaxLengRx) is greater than FaxLengIPD, wherein FaxLengIPD may indicate, for example, the amount of fax image data transmitted for a pre-configured inter-packet delay.

T.30 call establishment problem detector 461 may detect T.30 call establishment problems. Applicant has realized that in spite of automatic T.30 call establishment initiated by fax terminals, the FoIP gateways, due to various problems or conditions, may enter or force a manual T.30 call setup. For example, in case of V.34 fax calls, the manual call establishment of "4 bis b" may significantly increase the duration of fax session relative to the duration of fax session with automatic T.30 call setup of "4 bis a". Some FoIP gateways may block the V.8 ANSam signal or T.30 called (CED) fax tone. As a result, a calling fax terminal started in automatic call establishment mode with sending the calling (CNG) fax tone may not detect the automatic call procedure from the answer fax side, due to blocking of the answer tone CED or ANSam by the FoIP gateway. Accordingly, T.30 call establishment problem detector 461 may detect the manual call establishment "4 bis b", for example, by detecting V.8 call indicator (CI) message packets, and by detecting the absence of CED/ANSam packets from the answer fax side in presence of CNG packets from the calling fax side.

Incompatible FoIP call detector 462 may detect, for example, (a) conflicts of V.8 Negative Acknowledge (NAK) to V.8 Facsimile Application Profile (FAP) both relayed over the FoIP protocol, (b) T.30 control frames of Non-Standard facilities Set-up (NSS) and Non-Standard facilities Command (NSC), (c) complex T.30 operation, and/or (d) other types of FoIP call incompatibilities.

Incompatibility problem (a) may be a pure FoIP problem which may occur, for example, if a V.8 NAK message received from the answer side gateway indicates an absence of compatible mode with fax modes indicated in V.8 FAP message received from the calling fax side gateway. Incompatibility problem (b) may be detected if T.30 NSS or NSC frames are relayed in spite of blocking or destroying non-standard capabilities of answer fax by FoIP gateway(s). Because a FoIP protocol, for example T.38 protocol, supports only a standard operation mode, a gateway may prevent the non-standard capabilities to be transferred end-to-end from the answer fax to the calling fax. Nevertheless, the calling fax may start in a non-standard mode, for example, if this fax is configured for only secure fax transmission. Therefore, NSS or NSC frames detected in FoIP streams may be indicative of incompatible fax call. Furthermore, incompatibility problem (c) may be detected, for example, as some fax call options which may be normal for communication over switched networks, may be problematic for FoIP calls. For example, T.30 procedure interrupts, secure fax, duplex operation, Frame Not Valid (FNV), and some other T.30 capabilities may be not supported or not fully supported by the FoIP gateway(s). Accordingly, detection of such call options may assist in diagnosing the cause for FoIP call failures.

T.30 signal flow violation detector 463 may detect T.30 signal flow violations. For purposes of FoIP gateway diagnostics, T.30 signal flow violation detector 463 may verify the T.30 signal flow at the FoIP gateway by analyzing T.30 control streams exchanged in both directions: the FoIP streams sent by the diagnosed FoIP gateway toward the remote gateway (or towards the remote IP fax) over the IP network, and the FoIP streams sent by the remote gateway (or by the remote IP fax) over the IP network toward the diagnosed FoIP gateway. During a successful FoIP call, each diagnosed FoIP gateway is expected to consequently pass the T.30 phases or states, wherein a current T.30 phase or state may be derived by FoIP/T.30 state machine 469 from the previously-received streams in both directions. Accordingly, T.30 signal flow violation detector 463 may follow the T.30 gateway states, and may detect FoIP packets or FoIP streams which may be irrelevant to a current T.30 phase or to previously-received FoIP packets.

FoIP timeout detector 464 may detect FoIP timeouts. Applicant has realized that for the purposes of diagnostics and of FoIP QoS monitoring management, it may be useful to measure and/or monitor the no-stream timeout and/or the T.30 phase timeout.

The no-stream timeout may be detected in one FoIP direction (e.g., from FoIP receiver to FoIP emitter, or from FoIP emitter to FoIP receiver), or in both communication directions. Detection of a bi-directional no-stream timeout may be a sufficient reason for an upper-level application to close the FoIP monitoring of the fax call, and optionally to also close the FoIP call. The threshold of no-stream timeout may depend, for example, on the current T.30 phase.

The T.30 phase timeout may be detected regardless of the no-stream timeout. For example, the FoIP gateways may exchange over the IP network multiple attempts of T.30 pre-/post-message signals, such that no-stream timeout may not occur, but an excessively long pre-/post-message procedure may inform about serious problems in the FoIP gateway, or in the gateway analog signal interface, or in other elements of the FoIP setup.

T.30 TCF error detector 465 may detect T.30 TCF errors. In contrast to non-intrusive fax call data measurements (e.g., in accordance with ITU-T Recommendations E.459/E.460), in which a reason of TCF fallback may be unimportant or undetected, the present invention may utilize T.30 TCF error detector 465 to determine the reason/or and the source gateway causing T.30 TCF fallbacks. For example, T.30 TCF error detector 465 may check, may monitor and/or may verify that (a) the T.30 DCS transfer preceding T.30 TCF is normal, (2) that the length of TCF zeroes stream lays in the range defined by T.30, (3) that measured TCF inter-packet delay is supported by typical gateways, and/or (4) that there is no collision of DCS/TCF stream with a stream from FoIP receiver.

Fax image data error detector 466 may detect fax image data errors. In non-intrusive fax call data measurements (e.g., in accordance with ITU-T Recommendations E.459/E.460), in which a reason of fax image retransmission or rejection may be unimportant or undetected, the present invention may utilize fax image data error detector 466 to monitor the fax image streams, to monitor a result of fax page transfer, and to determine the reason and/or the source causing the fax image retransmission or rejection. The result of fax page transfer may be measured without verification of the fax image data, for example, by checking only a content of T.30 post-message response frame sent by FoIP receiver. Furthermore, fax image data error detector 466 using the result of monitoring fax image streams and the result of fax page transfer may determine the reason and/or the source causing the fax image retransmission or rejection. The fax image stream monitoring may be based on the fax image error check, and optionally, may use the fax image demodulation quality reported by the FoIP emitting gateway.

Optionally, fax image data may be transferred with incorporation of Error Correction Mode (ECM). Accordingly, fax image data error detector 466 may perform error check by verifying the headers of transferred T.4 Facsimile Coded Data (FCD) frames, FCD frame lengths, and by detecting Return to Control for Partial page (RCP) frames.

Optionally, in transfers of non-ECM fax image data, to satisfy the real-time requirements, fax image data error detector 466 may perform a reduced error check or a shortened or partial version of the error check process. For example, in a demonstrative minimal configuration, instead of full decoding of the fax image, fax image data error detector 466 may check the availability of fax image data and Return-To-Control (RTC) pattern. Furthermore, when verifying non-ECM fax image data, fax image data error detector 466 may check the image scan line data.

Fax call parameters detector 467 may detect, for example, a type of fax call, an exchanged value of fax data rate, a total number of fax pages transferred over the IP network, a number of pages transferred at maximal fax rate, the numbers of pages transferred at lower fax rates, the numbers of pages transferred error-free, the numbers of pages transferred with errors.

Fax image data rate estimator 468 may estimate an actual fax data rate. In contrast to fax call data measurements in switched networks, where the V.34 primary channel data signaling rate is extracted from MPh signal (e.g., in accordance with ITU-T Recommendation E.460), the actual data rate of V.34 FoIP transfer may be unavailable, for example, because the MPh content may not be relayed over the IP network. According to ITU-T Recommendation T.38, a maximal data rate acceptable by T.38 receiving gateway may be exchanged over the IP network. However, as for the data rate of T.38 emitting gateway, it is required only to be less or equal to the exchanged rate of the receiver. For estimation of actual data rate of ECM fax transfer, fax image data rate estimator 468 may take into account the total number of fax page data octets and FCD frames relayed over the IP network during the fax page image stream. The ECM fax data rate computed may be an approximate rate, since the HDLC protocol corresponds to asynchronous data transmission. Actual data rate of non-ECM fax image may be computed more accurately. Estimated actual V.34 fax image data rate may be used in FoIP call QoS evaluator 480. Furthermore, fax image data rate estimator 468 may help, for example, in diagnostics of V.34 and non-V.34 fax image transfer problems.

Figure of Merit (FOM) estimator 481 may estimate FOM metrics. According to ITU-T Recommendation E.458, the performance of end-to-end facsimile transmission may be evaluated by using the FOM metrics defined through seven different transaction types, ranging from type 1 (a perfect fax call) to type 7 (an incomplete fax call). In accordance with the present invention, Figure of Merit (FOM) estimator 481 may monitor and analyze FoIP streams exchanged between FoIP emitter and FoIP receiver, and may estimate the FOM metric of FoIP calls.

In accordance with the present invention, FoIP QoS monitor 415 or a dedicated module or component thereof, for example, FoIP equipment performance evaluator 470 may evaluate the performance of, or the QoS that is provided by, one or more of: a FoIP emitter, a FoIP receiver, an IP network path from FoIP emitter to FoIP QoS monitor 415, and/or an IP network path from FoIP receiver to FoIP QoS monitor.

FoIP equipment performance evaluator 470 may generate an indicator value for diagnostics of FoIP equipment. For example, an indicator value of "0" may indicate that diagnostics are absent (e.g., for equipment which cannot be evaluated in current FoIP session); an indicator value of "1" may indicate error-free operation; an indicator value of "2" may indicate operation with warnings; an indication value of "4" may indicate operation with errors; and indicator value of "6" (e.g., the sum of value 2 and value 4) may indicate operation with both warnings and errors. Other suitable values may be used, and other suitable representation methods may be used. Optionally, the diagnostics error or warning level may depend on end-to-end FOM metric(s). For example, T.30 problems detected at FoIP gateway may be considered as "errors" for severely erroneous fax calls or for failed fax calls, but may be considered as "warnings" for successful fax calls.

FoIP equipment performance evaluator 470, for example, may utilize (a) ITU-T defined fax QoS measurements, (b) FoIP stream measurements, (c) T.30 diagnostics measurements, and/or (d) logic decisions for diagnostics of FoIP equipment. The particular logic or decision-making algorithm about the source of FoIP problems may be tailored per FoIP QoS monitor 415, but may take into account one or more properties or considerations as discussed herein. Optionally, FoIP QoS monitor 415 using demodulation quality and demodulation parameters reported by FoIP gateway may evaluate the performance 474 of a switched network (e.g., PSTN 20) connected between service gateway 400 and fax terminal 10.

In accordance with the present invention, some types of problems detected in FoIP stream measurements may be considered definitely as FoIP gateway problems. This may include, for example, FoIP call establishment problems, FoIP stream violations, errors in FoIP streams transferring T.30 control packets, over-run errors of fax image streams, and most errors detected during T.30 diagnostics measurements. In contrast, some detected problems may be considered definitely as the network problems, for example, FoIP packet loss, high FoIP packet jitter or long IPD. Additionally, some detected problems may be attributed to faulty operation of FoIP gateways and the IP network, for example, FoIP stream collisions or under-run errors of FoIP streams.

A determination of the source of TCF or fax image transfer problem (for example, whether the problem source is the FoIP emitter or the FoIP receiver) may take into account the availability and amount of errors detected in TCF or fax image streams, as well as other aspects of FoIP and T.30 operations. As a demonstrative example, the discussion herein may describe a decision-making process about the FoIP source gateway responsible for regular G3 fax rate fallback which happened during a T.30 pre-message procedure. The decision (e.g., out of four possible cases) may depend on the TCF transferring method, as the T.30 TCF may be locally generated or may be transferred over the IP network.

In a first case, the TCF is locally generated by FoIP receiver but rejected by the fax terminal (the FoIP emitter in response on T.30 DCS received the T.30 FTT frame). Accordingly, the suitable decision may be to assign error level 2 (operation with warnings) to the FoIP receiver.

In a second case, the TCF is locally generated and confirmed by FoIP receiver, but the FoIP emitter relays in response on T.30 CFR (and instead of fax image) a new DCS frame, thereby indicating a fallback of modulation system or/and of fax rate. Accordingly, the suitable decision may be to assign error level 2 (operation with warnings) to the FoIP emitter.

In a third case, a good error-free TCF stream sent by FoIP emitter is rejected by FoIP receiver. Accordingly, the suitable decision may be to assign error level 2 (operation with warnings) to the FoIP receiver.

In a fourth case, the FoIP emitter sends a too short TCF stream or erroneous TCF stream, or fails to send TCF. Accordingly, the suitable decision may be to assign the error level 2 (operation with warnings) to the FoIP emitter.

The decisions in these four cases may further depend on fax maximum rate capabilities of the FoIP gateways. For example, if the DCS frame sent by the FoIP emitter indicates a bit rate above the maximum fax rate capability of the FoIP receiver, FoIP QoS monitor 415 may avoid assigning the error/warning level to the FoIP receiver.

Optionally, FoIP QoS monitor 415 may be used for diagnostics of fax terminal and of switched network between the FoIP gateway and the fax terminal Optional utilization of FoIP gateway status reporting of fax demodulation quality and parameters may assist in improved discrimination of FoIP problem sources, for example, FoIP gateway analog interface imperfections or switched network impairments.

FoIP QoS monitor 415 may generate proprietary reports indicating the fax QoS measurements, the FoIP stream measurements, the T.30 diagnostics measurements, and/or the diagnostics of FoIP equipment. In a demonstrative embodiment of the present invention, color indicators and/or evaluation values may be set to indicate an overall FoIP call result, by FoIP QoS monitor 415 or by a dedicated module or component thereof, for example, an overall FoIP call result evaluator 482. For example, a black color and/or an evaluation value of "0" may indicate that the fax call did not start. A green color and/or an evaluation value of "1" may indicate that a successful fax call passed with FOM equaling 1 (perfect fax call) and with diagnostics level not greater than 2 (operation with warnings) for all elements of FoIP equipment. A yellow color and/or an evaluation value of "2" may indicate that a successful fax call passed with FOM equaling 1 and with diagnostics level greater than 2 for one or more elements of FoIP equipment, or that successful fax call passed with FOM greater than 1 but smaller than 7 (incomplete fax call). A red color and/or an evaluation value of "3" may indicate an incomplete or incompatible fax call (corresponding to FOM value of 7). A gray color and/or an evaluation value of "4" may indicate that a one-way fax call ended without relaying T.30 signals from calling or answering fax side. Other suitable colors or evaluation values may be used.

Additionally to a final report with overall FoIP call result, FoIP QoS monitor 415 may report intermediate results, for example, every fax page transferred, or every pre-defined time interval (e.g., every 30 or 60 seconds).

Due to the specific nature of the FoIP service relative to the fax service over switched networks, some fax call data measurements which are defined in ITU-T Recommendation E.459 and/or in ITU-T Recommendation E.460 may not be required. Further, FoIP call data measurements in accordance with the present invention may utilize new types of measurements that are not defined in ITU-T Recommendation E.459 and/or ITU-T Recommendation E.460, and which may not necessarily be relevant to fax service over switched networks.

Figure 5:
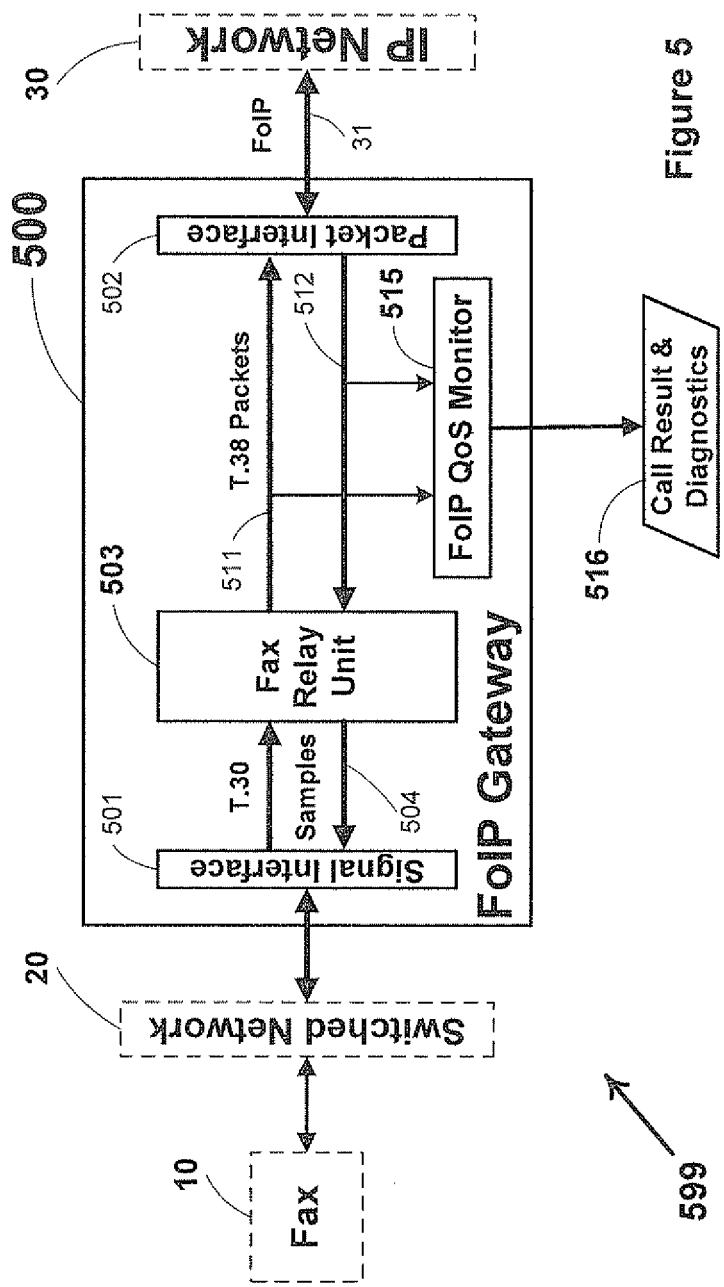
FIG. 5 is a schematic block-diagram illustration of a FoIP gateway including a FoIP QoS monitor, in accordance with the present invention.

Reference is made to FIG. 5, which is a schematic block-diagram illustration of a FoIP gateway 500 comprising a FoIP QoS monitor 515, in accordance with the present invention. FoIP gateway 500 may exchange T.30 signals 504 with a connected fax terminal 10 over a switched network 20 and through an analog signal interface 501. FoIP gateway 500 may exchange FoIP packets 31 over IP network 30 with a remote gateway or an IP fax. A packet interface 502 may be used for physical packet exchange over IP network 30 and, for example, for addition and deletion of network protocol headers during transmission and reception of FoIP packets by a fax relay unit 503. Fax relay unit 503 may process the sampled T.30 signals 504 and the fax relay packets, for example, T.38 packets 511 and 512. FoIP QoS monitor 515 may inspect the T.38 packets exchanged in two directions: T.38 packets 511 sent by fax relay unit 503 toward IP network 30, and T.38 packets 512 received from IP network 30 and forwarded to fax relay unit 503. On experience of fax call, FoIP QoS monitor 515 may report the call result and diagnostics 516 to an upper-level application for cumulative measurements and diagnostics. This report may be transferred, for example, over packet interface 502 and a local network and/or IP network 30. Optionally and additionally to the final report, FoIP QoS monitor 515 may report intermediate results, for example, every fax page transferred, or every pre-defined time interval (e.g., every 30 or 60 seconds).

Embedding or integration of FoIP QoS monitor 515 into FoIP gateway 500 may be implemented by one or more software modules and/or hardware components. Such integration may be beneficial when an original gateway does not support (partially or entirely) the fax QoS and diagnostics measurements. This may help to avoid undesired changes in fax relay unit 503 which may be responsible for fax relay.

The present invention may be used in conjunction with a Session Border Controller (SBC). For example, an SBC may optionally be used in a VoIP network, to exert control over the signaling and typically also the media streams involved in setting up, conducting, and/or tearing down calls. The SBC may enforce security, Quality of Service (QoS), and/or admission control mechanism over the VoIP sessions.

Figure 6:
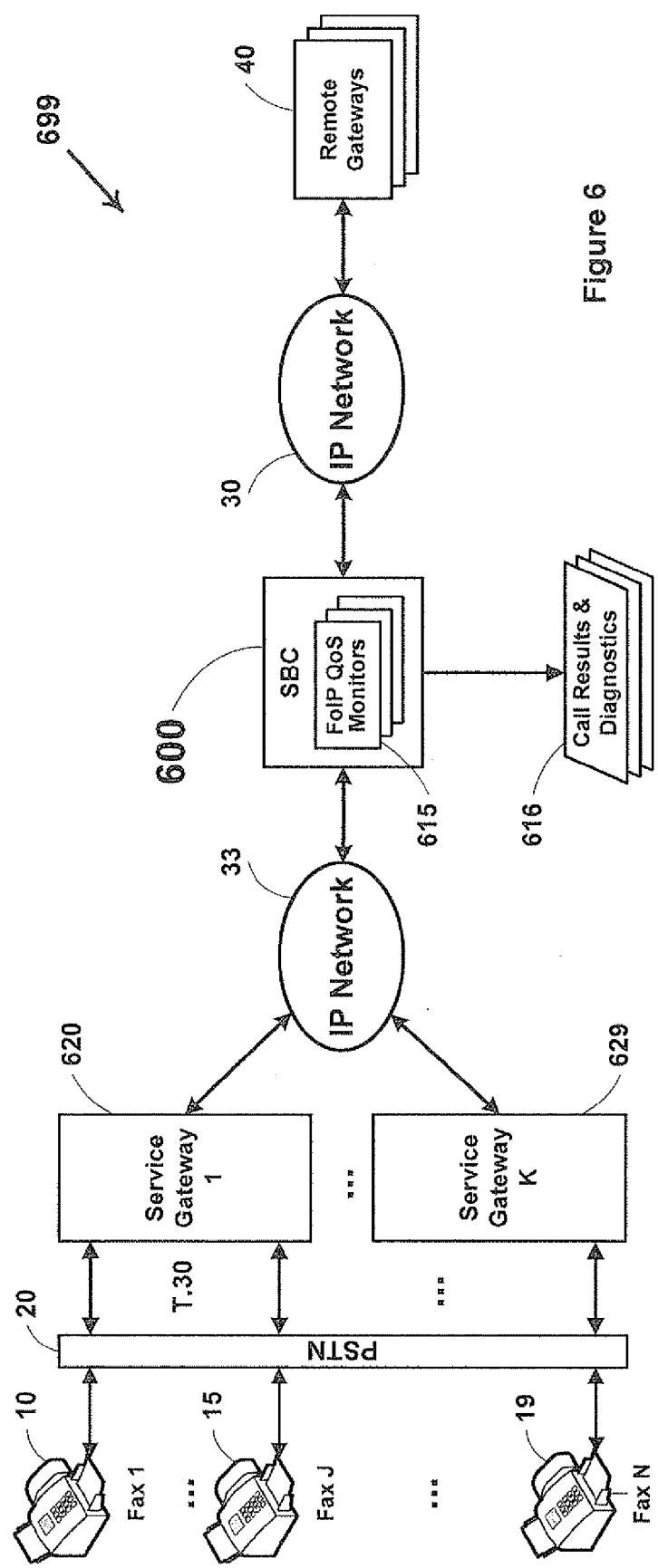
FIG. 6 is a schematic block-diagram illustration of a communication system including a Session Border Controller (SBC) which incorporates one or more a FoIP QoS monitors, in accordance the present invention.

Reference is made to FIG. 6, which is a schematic block-diagram illustration of a communication system 699 comprising a Session Border Controller (SBC) 600 which incorporates one or more a FoIP QoS monitors 615, in accordance the present invention. Multiple gateways, for example, gateway 1 (620) through gateway K (629) of a service provider may perform fax communications over an IP network 33. Each active channel of a service gateway may exchange the analog fax signals with a fax terminal over a PSTN 20, and may exchange the FoIP packets with one of remote gateways 40 (or a remote IP fax) over the IP networks 33 and 30. In system 699, some service gateways may be used as local gateways connected to SBC 600 over IP network 33, and other service gateways may operate as remote gateways connected to SBC 600 over IP network 30. All the calls of the service gateways 620-629 may be controlled by SBC 600. For example, SBC 600 may be able to control one or more fax calls simultaneously. In order to monitor N fax relay calls simultaneously (wherein N may be equal to or greater than one), SBC 600 may allocate and may manage N modules and/or instances of FoIP QoS monitor 615. On experience of each fax call, SBC 600 may report the call result and diagnostics 616 to an upper-level application for cumulative measurements and diagnostics. This report may be transferred, for example, over local or IP network 33. Optionally and additionally to the final reports, SBC 600 may report intermediate results, for example, every fax page transferred, or every pre-defined time interval (e.g., every 30 or 60 seconds).

Figure 7:
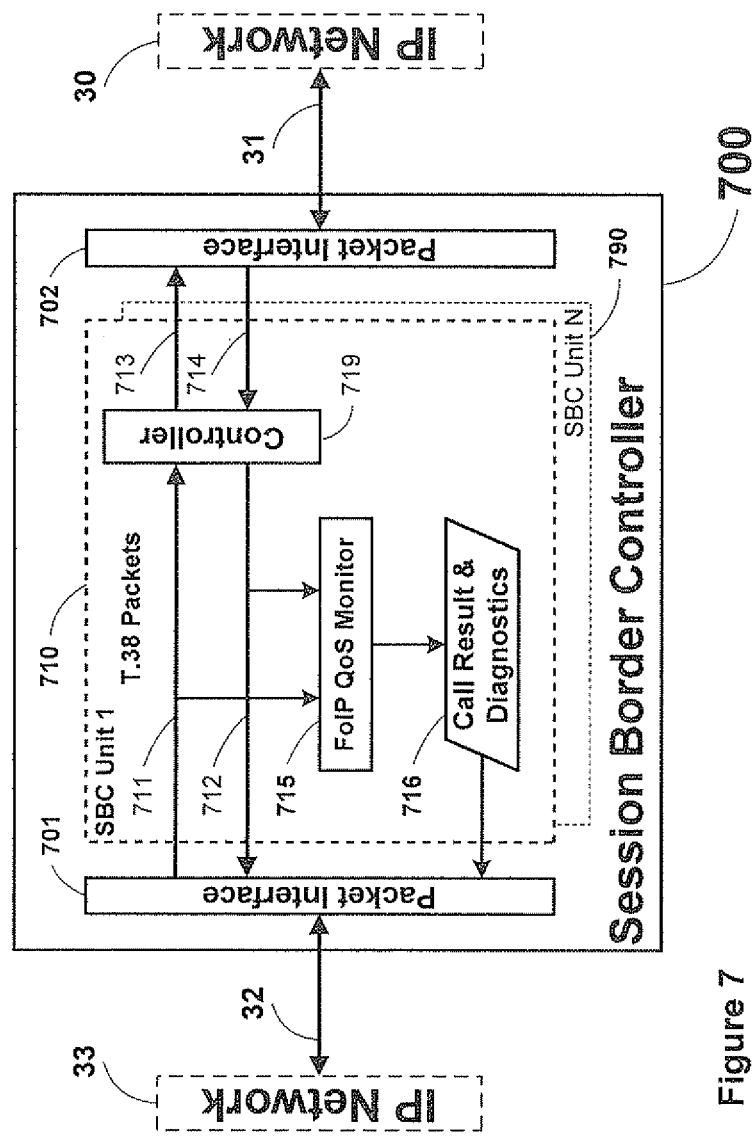
FIG. 7 is a schematic block-diagram illustration of an SBC incorporating a FoIP QoS monitor, in accordance with the present invention.

Reference is made to FIG. 7, which is a schematic block-diagram illustration of an SBC 700 incorporating a FoIP QoS monitor 715, in accordance with the present invention. SBC 700 may exchange packets 32 with FoIP gateways of a service provider over IP network 33, and may exchange packets 31 with remote gateways over IP network 30. Packet interfaces 701 and 702 may serve for physical packet exchange over the IP networks and, for example, for addition and deletion of IP headers during packet transmission and reception. SBC unit 710 may be capable of transferring a fax call, and may include, for example, a fax session controller 719 and FoIP QoS monitor 715. Fax session controller 719 may process the packets 711-714 received from to IP networks 33/30 over packet interfaces 701/702. The packet processing by the fax session controller 719 may include, for example, forwarding the T.38 packets 711 as packets 713; forwarding packets 714 as the T.38 packets 712; transcoding the T.38 packets 711 into packets 713; transcoding packets 714 into T.38 packets 712; securely encrypting/decrypting, and other operations. FoIP QoS monitor 715 may inspect the T.38 packets 711 and 712. On experience of a fax call, FoIP QoS monitor 715 may report the call result and diagnostics 716 to an upper-level application for cumulative measurements and diagnostics. This report may be transferred, for example, over packet interface 701 and the IP network 33. Optionally and additionally to the final report, FoIP QoS monitor 715 may report intermediate results, for example, every fax page transferred, or every pre-defined time interval (e.g., every 30 or 60 seconds).

SBC 700 may allocate more than one SBC units to control and monitor up to N fax sessions simultaneously (wherein N is greater than one). For example, SBC unit 1 (710) and other units up to SBC unit N (790) may be, for example, identical or may have different fax session controllers 719. SBC 700 may allocate the FoIP QoS monitors 715 dynamically, for example, allocating one FoIP QoS monitor 715 per every detected fax call; or allocating statically, according to a maximum number of fax calls which may be controlled simultaneously.

In accordance with the present invention, FoIP QoS monitoring may be performed externally to a FoIP gateway and/or externally to an SBC device, for example, at a workstation or a computer or a network server or other computing platform.

Figure 8:
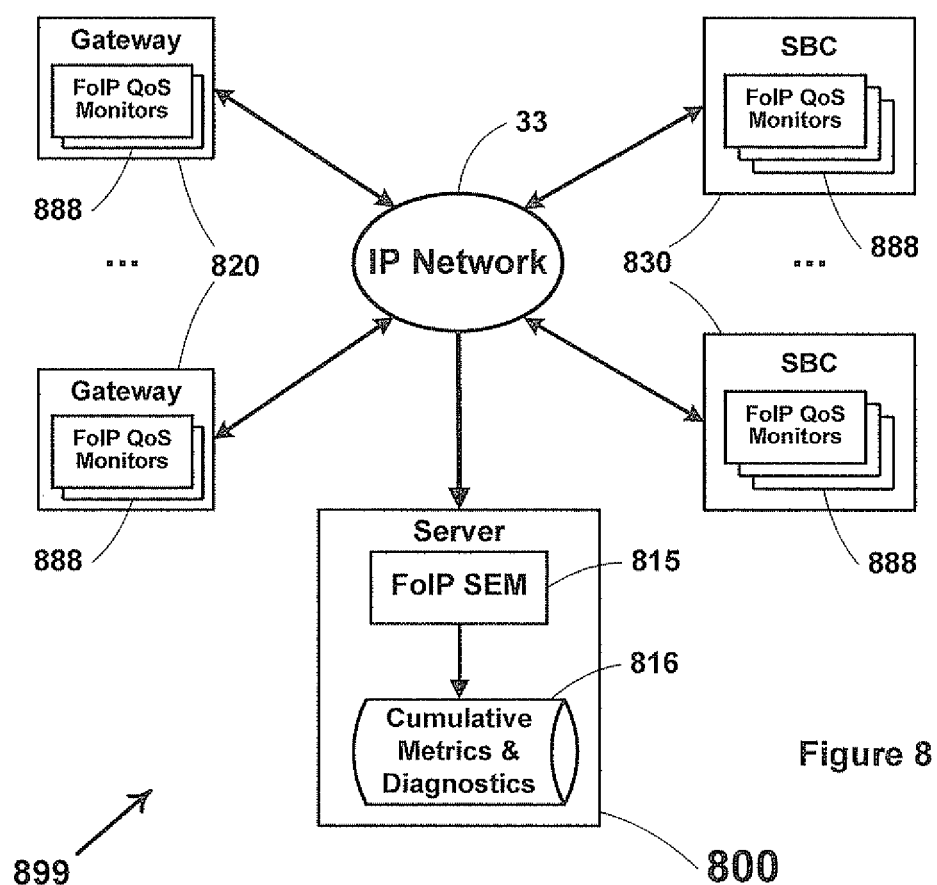
FIG. 8 is a schematic block-diagram illustration of a communication system in which a FoIP Session Experience Manager (SEM) operates externally to FoIP gateways and externally to SBC devices, in accordance with the present invention.

Reference is made to FIG. 8, which is a schematic block-diagram illustration of a communication system 899 in which a FoIP Session Experience Manager (SEM) 815 operates externally to FoIP gateways and externally to SBC devices, in accordance with the present invention. For example, FoIP SEM 815 may operate within a network server 800, may accumulate the fax relay call results and diagnostics from FoIP QoS monitors of one or more SBCs 830 controlling one or more service gateways or/and from FoIP QoS monitors of other service gateways 820 not controlled by SBC. Additionally, SBCs 830 and/or service gateways 820 may communicate with network server 800 over IP network 33. FoIP SEM 815 may report the overall metrics and diagnostics 816 of FoIP calls to network server 800. Each one of SBCs 830, and/or each one of service gateways 820, may include one or more FoIP QoS monitors 888 or other similar modules or components.

In real time, FoIP SEM 815 may perform cumulative fax data measurements with reporting the primary metrics, for example, in accordance with ITU-T Recommendations E.459/E.460. Such measurements may include, for example, percentage of call completion; percentage of calls using maximum transmission rate; and/or percentage of calls having good image quality. Additionally or alternatively, FoIP SEM 815 may calculate and report the secondary metrics per ITU-T Recommendations E.459/E.460. Additionally or alternatively, FoIP SEM 815 may calculate and report FoIP QoS metrics in accordance with the present invention.

In real time, FoIP SEM 815 may calculate cumulative diagnostics measurements to evaluate the overall performance of FoIP service equipment. For example, FoIP SEM 815 may calculate and report percentage of fax calls impaired by service (local) gateways; percentage of fax calls impaired by remote gateways or by remote IP faxes; and/or percentage of fax calls impaired by the IP network(s).

In real time, FoIP SEM 815 may further analyze cumulative data or aggregated data received from multiple FoIP QoS monitors 888, and may diagnose problems that were not necessarily detected and/or not necessarily reported explicitly by FoIP QoS monitors 888. For example, sufficiently high percentage (e.g., greater than a threshold percentage value) of fax calls impaired by fax rate fallbacks and/or by fax image errors detected from FoIP gateways, may indicate on possible problems in switched or ISDN networks over which the FoIP gateways exchange the analog fax signals with connected fax terminals.

In real time, FoIP SEM 815 may analyze cumulative data and may resolve a possible ambiguity of the diagnostics generated by the multiple FoIP QoS monitors 888. For example, some FoIP problems may be caused both by FoIP gateways and by fax terminals. However, a consistent presence of the same FoIP problem at different fax terminals may indicate existence of a FoIP gateway problem (rather than a fax terminal problem). In contrast, presence of the same FoIP problem in communication with a particular fax terminal over different vendor FoIP gateways may indicate problems in the fax terminal (and not in the FoIP gateways).

In real time, FoIP SEM 815 may analyze cumulative data to derive optimal configuration parameters of FoIP service gateways. In a first example, cumulative measurements of FoIP inter-packet delay (IPD) may be used to derive an optimal fax relay IPD configuration parameter of gateways. A lower IPD configuration parameter may help to improve the interoperability of FoIP service gateways with different fax terminals and different vendor FoIP gateways, and to reduce the gateway processing delay and a total duration of FoIP call. Alternatively, a higher IPD configuration parameter may be applied for better tolerance of FoIP service gateways to network jitter. In a second example, cumulative measurements of FoIP packet loss may be used to derive an optimal depth of FoIP error-correction data to configure the FoIP service gateways and/or to be negotiated with remote gateways.

The optimal or preferred configuration parameters of FoIP gateways, derived by FoIP SEM 815, may be loaded or transferred to service gateways and/or to SBCs, automatically, manually (e.g., with the help of FoIP service administrator), on-demand, at pre-defined time intervals, on an hourly or daily basis, in response to a triggering event, when a pre-defined condition is met, or the like.

The present invention may be used in conjunction with fax relay technology, for example, for transferring facsimile calls in real time over Internet Protocol (IP) networks. The present invention may be used by systems operating in accordance with the Fax-over-IP (FoIP) protocol, for example, as standardized in ITU-T Recommendation T.38. The present invention may be used by network operators providing the FoIP service, who may desire to control the quality of fax calls relayed over the IP network. The present invention may be used by systems which may also utilize ITU-T Recommendations E.450-E.454 and E.456-E.460, which define general aspects of facsimile Quality of Service (QoS) on public networks, measurement technology, fax call measurements, and cumulative measurements.

The present invention may include devices, systems, and methods of fax relay Quality of Service (QoS), as well as diagnostics of types and sources of possible fax relay problems; which may be achieved by utilizing one or more real-time FoIP QoS monitors (or monitoring modules).

The real-time FoIP protocol used by the FoIP QoS monitor may be a standard T.38 protocol, for example, the Internet Fax Protocol (IFP) transferred over Transmission Control Protocol/Internet Protocol (TCP/IP), the IFP encapsulated in User Datagram Protocol Transport Layer (UDPTL) transferred over User Datagram Protocol/Internet Protocol (UDP/IP), the IFP encapsulated in Real-time Transport Protocol (RTP) transferred over UDP/IP, or another standard T.38 protocol.

In some embodiments, for example, the real-time FoIP protocol used by the FoIP QoS monitor may be the T.38 UDPTL encapsulated in RTP transferred over UDP/IP, for example, as described in U.S. Pat. No. 7,899,038, which is incorporated herein by reference in its entirety.

In some embodiments, for example, the real-time FoIP protocol used by the FoIP QoS monitor may be an enhanced or extended or modified or improved T.38 protocol or an equivalent or similar protocol, which may be standard or proprietary.

In some embodiments, for example, the FoIP QoS monitor may analyze the real-time FoIP streams from FoIP emitter gateway and FoIP receiver gateway. To satisfy the real-time confinements, the FoIP QoS monitor may limit the processing and analysis of the FoIP streams by the QoS and diagnostics measurements; for example, the FoIP QoS monitor may avoid a full or partial decoding of relayed fax image data.

In some embodiments, for example, the FoIP QoS monitor may carry out the fax QoS and diagnostics measurements in real-time while avoiding fax signal recording and/or while avoiding network packet recording.

In some embodiments, for example, the FoIP QoS monitor may perform the QoS measurements compliant to non-intrusive fax QoS measurements defined in ITU-T Recommendations.

In some embodiments, for example, the FoIP QoS monitor may optionally use the real-time FoIP status reports of a local or controlled gateway.

In some embodiments, for example, the FoIP QoS monitor may perform the diagnostics measurements to estimate the quality of operation of communicating gateways, of the IP network, optionally, of fax terminals, and optionally, of the switched network.

In some embodiments, for example, the FoIP QoS monitor may diagnose and/or may detect various problems of fax communication over the packet networks.

In some embodiments, for example, the FoIP QoS monitor may establish a source equipment responsible of degradation of fax relay QoS. For example, the problem may be attributed to (a) FoIP emitter, (b) FoIP receiver, (c) network path from FoIP emitter to the FoIP QoS monitor, (d) network path from FoIP receiver to the FoIP QoS monitor, (e) optionally, calling fax terminal, (f) optionally, answering fax terminal, and/or (g) optionally, switched network.

In some embodiments, for example, the FoIP QoS monitor may be embedded in a gateway, or in an SBC, or may be external to such devices, or may be implemented within a network server or workstation or other computing platform.

In some embodiments, for example, a fax relay quality of service apparatus may include a FoIP session experience manager, which may log and accumulate the FoIP QoS measurements reported by one or more FoIP QoS monitors. The FoIP session experience manager may perform overall QoS metrics of FoIP calls transferred by controlled gateways. The FoIP session experience manager may perform cumulative diagnostics of fax relay problems reported by one or more FoIP QoS monitors.

Some embodiments of the present invention may operate, and may monitor and/or evaluate FoIP QoS, without the need to record fax signals (e.g., in their original sampling wave form), and/or without the need to demodulate (e.g., in real-time) analog fax signals and then record them by using a signal data log, and/or without the need to store recorded fax signals or copies of fax signals for subsequent off-line analysis of such pre-recorded fax signals.

Some embodiments of the present invention may operate, and may monitor and/or evaluate FoIP QoS, without the need to record FoIP streams for subsequent off-line analysis of such pre-recorded FoIP streams.

The terms "local" and "remote" may be considered as formal terms. The term "local" may be equivalent to "one side", and the term "remote" may be equivalent to "other side". Any two FoIP devices communicating over the IP network may be considered as a pair of a local FoIP device and a remote FoIP device.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented by using a pre-installed application, a download-able application, an application available for purchase and/or for downloading from an "application store" or a "virtual market" for smartphone applications, an application residing as machine-readable code or program on an article or storage medium (e.g., CD-ROM, flash drive, memory stick, USB flash drive, non-transitory medium or storage medium), or the like.

Functions, operations, components and/or features described herein with reference to one or more embodiments, may be combined with, or may be utilized in combination with, one or more other functions, operations, components and/or features described herein with reference to one or more other embodiments.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. An apparatus for measuring Quality of Service (QoS) of Fax over Internet Protocol (FoIP) calls, the apparatus comprising:

a FoIP packet monitoring module, that is connected along a FoIP route between a FoIP emitter device and a FoIP receiver device, and that is external to said FoIP emitter device and is external to said FoIP receiver device, to monitor in real-time and in two communication directions, and externally to said FoIP emitter device and FoIP receiver device, Internet Protocol (IP) network streams of T.38 packets that are exchanged over an IP network in a first communication direction from said FoIP emitter device to said FoIP receiver device and also in a second communication direction from said FoIP receiver device to said FoIP emitter device, wherein the FoIP packet monitoring module is to detect FoIP call problems and to diagnose sources of said FoIP call problems, externally to said FoIP emitter and FoIP receiver devices, along said FoIP route between the FoIP emitter device and the FoIP receiver device, by monitoring (a) FoIP T.30 control streams transferred over T.38 protocol along said FoIP communication route in said first communication direction and (b) FoIP T.30 control streams transferred over T.38 protocol along said FoIP communication route in said second communication direction;

wherein the FoIP packet monitoring module is to measure QoS of FoIP calls and to diagnose source reasons of fax image rejections, along said FoIP communication route, and externally to said FoIP emitter and FoIP receiver devices, by (A) checking contents of FoIP T.30 post-message response frames that are transferred over T.38 protocol along said FoIP communication route in said second communication direction, and by (B) checking data errors of FoIP fax image streams transferred over T.38 protocol along said FoIP communication route in said first communication direction;

wherein the FoIP racket monitoring module is to detect, based on real-time monitoring of FoIP packets exchanged over said IP network, numbers of fax pages transferred during a T.38 fax call as digital FoIP packets over said IP network between said FoIP emitter device and said FoIP receiver device;

wherein said numbers of fax pages transferred, that are detected by the FoIP packet monitoring module based on real-time monitoring of digital FoIP packets, include at least two numbers which comprise a total number of fax pages transferred, and a number of fax pages transferred at maximal fax rate.

2. The apparatus of claim 1, wherein the apparatus comprises:

a FoIP stream collision detector to check correspondence of (a) FoIP streams of digital FoIP packets received from the IP network to (b) a current T.30 phase of said FoIP emitter device and said FoIP receiver device; and based on that check, and without demodulating analog fax signals, to detect collisions of FoIP streams of digital FoIP packets exchanged between said FoIP emitter device and said FoIP receiver device;

wherein said FoIP stream collision detector is to verify, during T.30 pre-message procedure of T.30 Training Check Frame (TCF) transfer, that Digital Command Signal (DCS) and TCF packet stream of T.38 packets from said FoIP emitter device is transferred in said first communication direction not during time of a T.38 packet stream transferred in said second communication direction from said FoIP receiver device.

3. The apparatus of claim 1, wherein the apparatus comprises:

a FoIP T.30 control stream under-run error detector to detect a possible data under-run error of a T.30 control signal transmitter of a FoIP gateway by detecting T.30 data octets delayed in said IP network longer than a pre-defined Inter-Packet Delay (IPD) interval.

4. The apparatus of claim 1, wherein the apparatus comprises:
- a FoIP packet loss detector (a) to detect FoIP packet loss of T.30 control streams sent by said FoIP emitter device, and (b) to detect FoIP packet loss of T.30 control streams sent by said FoIP receiver device, and (c) to detect FoIP packet loss of fax image streams sent by said FoIP emitter device; and
- an Inter-Packet Delay (IPD) detector to detect a long IPD in a FoIP stream of digital FoIP packets sent between said FoIP emitter device and said FoIP receiver device by measuring time delays between consecutive digital FoIP data packets of said FoIP stream,
- wherein said Inter-Packet Delay (IPD) detector is (i) to determine IPD of T.30 control streams sent by said FoIP receiver device, and (ii) to determine IPD of T.30 control streams sent by said FoIP emitter device, and (iii) to determine IPD of fax image streams sent as digital FoIP packets by said FoIP emitter device.

5. The apparatus of claim 1, wherein the apparatus comprises:
- a fax image data error detector to check fax image data errors of said FoIP fax image streams that transfer fax image as digital FoIP packets;
- wherein when checking fax image data transferred as digital FoIP packets over T.38 protocol with incorporation of T.4 Error Correction Mode (ECM), said fax image data error detector is (A) to verify headers of T.4 Facsimile Coded Data (FCD) frames, and (B) to verify FCD frame lengths, and (C) to detect Return to Control for Partial page (RCP) frames,
- wherein when checking T.4 non-ECM fax image data transferred as digital FoIP packets over T.38 protocol, said fax image data error detector operates without full decoding of the fax image, and said fax image data error detector is to detect availability of fax image data with Return-To-Control (RTC) pattern.

6. The apparatus of claim 1, wherein the apparatus comprises:
- an incompatible FoIP call detector to detect, based on real-time monitoring of FoIP packets exchanged over said IP network during an established T.38 session, a FoIP call which may be unsupported by at least one of: said FoIP emitter device and said FoIP receiver device,
- wherein said incompatible FoIP call detector is to detect T.38 V.8 Negative Acknowledge (NAK) indicating no compatible mode available detected during checking FoIP V.8 messages transferred over T.38 protocol,
- wherein said incompatible FoIP call detector is to detect T.30 Non-Standard facilities Setup (NSS) frame during a checking of FoIP facsimile control fields (FCFs) of FoIP T.30 control streams transferred over T.38 protocol.

7. The apparatus of claim 1, wherein the apparatus comprises a T.30 Training Check Frame (TCF) stream under-run error detector to detect, based on monitoring of TCF digital data transferred over T.38 protocol in digital FoIP packets, a possible data under-run error of a T.30 TCF transmitter of FoIP receiver by detecting T.30 TCF data octets delayed in said IP network longer than a pre-defined Inter-Packet Delay (IPD) interval;
- wherein the apparatus comprises a T.30 TCF error detector to detect, based on monitoring of TCF digital data transferred over T.38 protocol in digital FoIP packets, a T.30 TCF error in a T.30 TCF stream transferred over T.38 protocol from said FoIP emitter device to said FoIP receiver device.

8. The apparatus of claim 1, wherein the apparatus comprises:
- a timeout detector to detect, based on monitoring of digital FoIP packets, and during an established T.38 FoIP call over said IP network, at least one of:
  - a no-stream FoIP timeout,
  - a T.30 pre-message phase timeout, and
  - a T.30 post-message phase timeout;
- wherein the timeout detector is to detect said no-stream FoIP timeout when FoIP streams of digital FoIP packets are not transferred in both of said two communication directions for a time sufficiently long to stop FoIP monitoring of current FoIP call.

9. The apparatus of claim 1, comprising:
- an evaluation unit to monitor in real-time digital FoIP packets, and to evaluate in real time a performance of the IP network during a FoIP call in which digital FoIP packets are transferred, and to evaluate in real time, and without demodulating analog fax signals, a performance of at least one of: the FoIP emitter device, and the FoIP receiver device.

10. The apparatus of claim 1, comprising a FoIP call Quality of Service (QoS) evaluator to monitor in real-time digital FoIP packets and to evaluate a QoS of a FoIP call, wherein the FoIP call QoS evaluator comprises:
- a Figure of Merit (FOM) estimator, to estimate, based on real-time monitoring of digital FoIP packets exchanged over the IP network, a FOM value associated with said FoIP call; and
- an overall FoIP call result evaluator, to estimate, based on real-time monitoring of digital FoIP packets exchanged over the IP network, a quality of FoIP call taking into account an output generated by at least one of: the FOM estimator, and said FoIP equipment evaluator.

11. The apparatus of claim 1, wherein the apparatus is a Session Border Controller (SBC).

12. The apparatus of claim 1, wherein the apparatus is a computerized platform external to said FoIP emitter device, external to said FoIP receiver device, external to a FoIP gateway, and external to a Session Border Controller (SBC).

13. An apparatus for measuring Quality of Service (QoS) of Fax over Internet Protocol (FoIP) calls, the apparatus comprising:
- a FoIP packet monitoring module, that is connected along a FoIP route between a FoIP emitter device and a FoIP receiver device, and that is external to said FoIP emitter device and is external to said FoIP receiver device, to monitor in real-time and in two communication directions, and externally to said FoIP emitter device and FoIP receiver device, Internet Protocol (IP) network streams of T.38 packets that are exchanged over an IP network in a first communication direction from said FoIP emitter device to said FoIP receiver device and also in a second communication direction from said FoIP receiver device to said FoIP emitter device,
- wherein the FoIP packet monitoring module is to detect FoIP call problems and to cagnose sources of said FoIP call problems, externally to said FoIP emitter and FoIP receiver devices, along said FoIP route between the FoIP emitter device and the FoIP receiver device, by monitoring (a) FoIP T.30 control streams transferred over T.38 protocol along said FoIP communication route in said first communication direction and (b) FoIP T.30 control streams transferred over T.38 protocol along said FoIP communication route in said second communication direction;

wherein the FoIP acket monitorin module is to measure QoS of FoIP calls and to dia. nose source reasons of fax ima.e rejections, along said FoIP communication route, and externally to said FoIP emitter and FoIP receiver devices, by (A) checking contents of FoIP T.30 post-message response frames that are transferred over T.38 protocol along said FoIP communication route in said second communication direction, and by (B) checking data errors of FoIP fax image streams transferred over T.38 protocol along said FoIP communication route in said first communication direction;
and
a fax image stream transfer error detector (A) to make a determination that an amount of fax image data received during a measured time interval from said IP network over T.38 protocol, excluding an amount of fax image data that can be transmitted to a fax terminal by said FoIP receiver device during said measured time interval, exceeds a maximum buffer size T.38 capability of said FoIP receiver device; and (B) based on said determination, to detect possible data over-run errors at a fax image transmitter of said FoIP receiver device.

14. An apparatus for measuring Quality of Service (QoS) of Fax over Internet Protocol (FoIP) calls, the apparatus comprising:
a FoIP packet monitoring module, that is connected along a FoIP route between a FoIP emitter device and a FoIP receiver device, and that is external to said FoIP emitter device and is external to said FoIP receiver device, to monitor in real-time and in two communication directions, and externally to said FoIP emitter device and FoIP receiver device, Internet Protocol (IP) network streams of T.38 packets that are exchanged over an IP network in a first communication direction from said FoIP emitter device to said FoIP receiver device and also in a second communication direction from said FoIP receiver device to said FoIP emitter device,
wherein the FoIP packet monitoring module is to detect FoIP call problems and to diagnose sources of said FoIP call problems, externally to said FoIP emitter and FoIP receiver devices, along said FoIP route between the FoIP emitter device and the FoIP receiver device, by monitoring (a) FoIP T.30 control streams transferred over T.38 protocol along said FoIP communication route in said first communication direction and (b) FoIP T.30 control streams transferred over T.38 protocol along said FoIP communication route in said second communication direction;
wherein the FoIP packet monitoring module is to measure QoS of FoIP calls and to diagnose source reasons of fax image rejections, along said FoIP communication route, and externally to said FoIP emitter and FoIP receiver devices, by (A) checking contents of FoIP T.30 post-message response frames that are transferred over T.38 protocol along said FoIP communication route in said second communication direction, and by (B) checking data errors of FoIP fax image streams transferred over T.38 protocol along said FoIP communication route in said first communication direction;
and
a FoIP T.30 control stream error detector to detect errors of FoIP T.30 control streams by performing all of these steps:
(a) checking FoIP T.30 indicators,
(b) checking errors of FoIP High-level Data Link Control (HDLC) frames of V.21 data and of V.34 control channel data,
(c) checking FoIP facsimile control fields (FCFs) of V.21 data and of V.34 control channel data,
(d) checking re-ordering of FoIP T.30 final frames of V.21 data and of V.34 control channel data, and
(e) checking FoIP V.8 messages;
wherein based on said checking steps (a) through (e), the FoIP T.30 control stream error detector is to determine errors of said FoIP T.30 control streams that are transferred over T.38 protocol;
wherein the apparatus comprises a T.30 call establishment problem detector to detect a manual T.30 call establishment "4 bis b" between said FoIP emitter device and said FoIP receiver device by detecting FoIP V.8 call indicator message packets transferred over T.38 protocol.

15. An apparatus for measuring Quality of Service (QoS) of Fax over Internet Protocol (FoIP) calls, the apparatus comprising:
a FoIP packet monitorin module that is connected alon a FoIP route between a FoIP emitter device and a FoIP receiver device, and that is external to said FoIP emitter device and is external to said FoIP receiver device, to monitor in real-time and in two communication directions, and externally to said FoIP emitter device and FoIP receiver device, Internet Protocol (IP) network streams of T.38 packets that are exchanged over an IP network in a first communication direction from said FoIP emitter device to said FoIP receiver device and also in a second communication direction from said FoIP receiver device to said FoIP emitter device,
wherein the FoIP packet monitoring module is to detect FoIP call problems and to diagnose sources of said FoIP call problems, externally to said FoIP emitter and FoIP receiver devices, along said FoIP route between the FoIP emitter device and the FoIP receiver device, by monitoring (a) FoIP T.30 control streams transferred over T.38 protocol along said FoIP communication route in said first communication direction and (b) FoIP T.30 control streams transferred over T.38 protocol along said FoIP communication route in said second communication direction;
wherein the FoIP packet monitoring module is to measure QoS of FoIP calls and to diagnose source reasons of fax image rejections, along said FoIP communication route, and externally to said FoIP emitter and FoIP receiver devices, by (A) checking contents of FoIP T.30 post-message response frames that are transferred over T.38 protocol along said FoIP communication route in said second communication direction, and by (B) checking data errors of FoIP fax image streams transferred over T.38 protocol along said FoIP communication route in said first communication direction;
and
a fax image data rate estimator to monitor digital FoIP packets and based on monitored digital FoIP packets,
(A) to measure a total number of fax page data octets and T.4 Facsimile Coded Data (FCD) frames that are transferred over T.38 protocol during a fax page image stream that is transferred as digital FoIP packets;
(B) to monitor asynchronous High-level Data Link Control (HDLC) frames used for Error Correction Mode (ECM) fax transmission from fax terminal equipment toward said FoIP emitter device; and
(C) to estimate, based on real-time monitoring of digital FoIP packets exchanged over said IP network, a V.34 fax image data signaling rate of said FoIP emitter device.

16. An apparatus for measuring Quality of Service QoS) of Fax over Internet Protocol (FoIP) calls, the apparatus comprising:

a FoIP packet monitoring module, that is connected along a FoIP route between a FoIP emitter device and a FoIP receiver device, and that is external to said FoIP emitter device and is external to said FoIP receiver device, to monitor in real-time and in two communication directions, and externally to said FoIP emitter device and FoIP receiver device, Internet Protocol (IP) network streams of T.38 packets that are exchanged over an IP network in a first communication direction from said FoIP emitter device to said FoIP receiver device and also in a second communication direction from said FoIP receiver device to said FoIP emitter device, wherein the FoIP packet monitoring module is to detect FoIP call problems and to diagnose sources of said FoIP call problems, externally to said FoIP emitter and FoIP receiver devices, along said FoIP route between the FoIP emitter device and the FoIP receiver device, by monitoring (a) FoIP T.30 control streams transferred over T.38 protocol along said FoIP communication route in said first communication direction and (b) FoIP T.30 control streams transferred over T.38 protocol along said FoIP communication route in said second communication direction;

wherein the FoIP packet monitoring module is to measure QoS of FoIP calls and to diagnose source reasons of fax image rejections, along said FoIP communication route, and externally to said FoIP emitter and FoIP receiver devices, by (A) checking contents of FoIP T.30 post-message response frames that are transferred over T.38 protocol along said FoIP communication route in said second communication direction, and by (B) checking data errors of FoIP fax image streams transferred over T.38 protocol along said FoIP communication route in said first communication direction;

and a fax image stream transfer error detector to monitor in real time digital FoIP packets exchanged over the IP network, and (A) to make a determination that an amount of fax image data received as digital FoIP packets during a measured time interval from said IP network over T.38 protocol, excluding an amount of fax image data that can be transmitted as fax image signal to a fax terminal by said FoIP receiver device for said measured time interval, is insufficient for transmitting by said FoIP receiver device to said fax terminal for a pre-defined Inter-Packet Delay (IPD) interval; and (B) based on said determination, to detect possible data under-run errors at a fax image transmitter of said FoIP receiver device which is external to said apparatus.

17. An apparatus for measuring Quality of Service (QoS) of Fax over Internet Protocol (FoIP) calls, the apparatus comprising:

a FoIP packet monitoring module, that is connected along a FoIP route between a FoIP emitter device and a FoIP receiver device, and that is external to said FoIP emitter device and is external to said FoIP receiver device, to monitor in real-time and in two communication directions, and externally to said FoIP emitter device and FoIP receiver device, Internet Protocol (IP) network streams of T.38 packets that are exchanged over an IP network in a first communication direction from said FoIP emitter device to said FoIP receiver device and also in a second communication direction from said FoIP receiver device to said FoIP emitter device, wherein the FoIP packet monitoring module is to detect FoIP call problems and to diagnose sources of said FoIP call problems, externally to said FoIP emitter and FoIP receiver devices, along said FoIP route between the FoIP emitter device and the FoIP receiver device, by monitoring (a) FoIP T.30 control streams transferred over T.38 protocol along said FoIP communication route in said first communication direction and (b) FoIP T.30 control streams transferred over T.38 protocol along said FoIP communication route in said second communication direction;

wherein the FoIP packet monitorin module is to measure QoS of FoIP calls and to diagnose source reasons of fax image rejections, along said FoIP communication route, and externally to said FoIP emitter and FoIP receiver devices, by (A) checking contents of FoIP T.30 post-message response frames that are transferred over T.38 protocol along said FoIP communication route in said second communication direction, and by (B) checking data errors of FoIP fax image streams transferred over T.38 protocol along said FoIP communication route in said first communication direction;

wherein the FoIP packet monitoring module is to detect a FoIP call problem of fax rate fallback during T.30 pre-message procedure;

wherein in said first communication direction, the FoIP packet monitoring module is to detect Digital Command Signal (DCS) and errors of Training Check Frame (TCF) stream;

wherein in said second communication direction, the FoIP packet monitoring module is to detect one or more pre-message responses selected from the group consisting of: Failure To Train (FTT) and Confirmation To Receive (CFR);

wherein, based on (i) DCS detection, and (ii) TCF error detection, and (iii) pre-message response detection, the FoIP packet monitoring module is to determine that said FoIP receiver device is a source of FoIP call problem of fax rate fallback, if FTT is detected in response on correct DCS and TCF;

wherein, based on (i) DCS detection, and (ii) TCF error detection, and (iii) pre-message response detection, the FoIP packet monitoring module is to determine that said FoIP emitter device is a source of FoIP call problem of fax rate fallback, if DCS indicating fax rate fallback is detected after CFR.

* * * * *